United States Patent
Sato

(10) Patent No.: US 6,636,284 B2
(45) Date of Patent: *Oct. 21, 2003

(54) SYSTEM AND METHOD FOR PROVIDING AN ELECTRO-OPTICAL DEVICE HAVING LIGHT SHIELD LAYERS

(75) Inventor: Takashi Sato, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 118 days.

This patent is subject to a terminal disclaimer.

(21) Appl. No.: 09/923,336

(22) Filed: Aug. 8, 2001

(65) Prior Publication Data

US 2002/0018278 A1 Feb. 14, 2002

(30) Foreign Application Priority Data

Aug. 11, 2000 (JP) .......................... 2000-244586
Aug. 31, 2000 (JP) .......................... 2000-263560
Jun. 20, 2001 (JP) .......................... 2001-186699
Jun. 20, 2001 (JP) .......................... 20001-186700

(51) Int. Cl.[7] .................. G02F 1/1333; G02F 1/136; G02F 1/343
(52) U.S. Cl. .................. 349/110; 349/111; 349/43; 349/44; 349/39
(58) Field of Search .................. 349/110, 111, 349/42, 43, 44, 39

(56) References Cited

U.S. PATENT DOCUMENTS

| | | | | |
|---|---|---|---|---|
| 5,966,193 A | * | 10/1999 | Zhang et al. | ........... 349/110 |
| 6,211,928 B1 | * | 4/2001 | Oh et al. | ........... 349/43 |
| 6,317,187 B1 | * | 11/2001 | Nakajima et al. | ........... 349/155 |
| 6,388,721 B1 | * | 5/2002 | Murade | ........... 349/44 |
| 6,449,022 B1 | * | 9/2002 | Fukata et al. | ........... 349/44 |

FOREIGN PATENT DOCUMENTS

| | | | |
|---|---|---|---|
| JP | 58-159516 A | * | 9/1983 |
| JP | 9033944 | | 2/1997 |

* cited by examiner

Primary Examiner—Tarifur R. Chowdhury
(74) Attorney, Agent, or Firm—Oliff & Berridge, PLC

(57) ABSTRACT

This invention provides an electro-optical device that includes on a TFT array substrate, scanning lines, data lines, a plurality of TFTs connected to these lines, pixel electrodes connected to the TFTs, an upper light shield layer which is formed in a grid-like configuration above the plurality of TFTs and defines a non-aperture area of each pixel, and a lower light shield layer which is formed in a grid-like configuration beneath the plurality of TFTs. In an image display area in a plan view, the formation area of the lower light shield layer is within the formation area of the upper light shield layer, and a channel region of the TFT is within a crossing portion of the lower light shield layer. In this arrangement, the electro-optical device presents a high quality image with increased light resistance.

25 Claims, 14 Drawing Sheets

SYSTEM AND METHOD FOR PROVIDING AN ELECTRO-OPTICAL DEVICE HAVING LIGHT SHIELD LAYERS

BACKGROUND OF THE INVENTION

1. Field of Invention

The present invention relates to an active-matrix type electro-optical device and, more particularly, to an electro-optical device of the type that includes pixel switching thin-film transistors (TFTs) within a laminate structure on a substrate.

2. Description of Related Art

If incident light rays enter the channel region of a pixel switching TFT arranged for each pixel in a TFT active-matrix type electro-optical device, a current is generated through photoexcitation, thereby changing characteristics of the TFT. Particularly, in an electro-optical device being used as a light valve in a projector, it is important to block incident light entering the channel region of the TFT and the peripheral area thereof because of the high intensity of the incident light. This can be accomplished by a light shield layer, arranged on a counter substrate and defining the aperture area of each pixel, or a data line fabricated of a metal film such as Al (aluminum) and extending over the TFT blocks light entering the channel region and the peripheral area thereof. Japanese Unexamined Patent Application Publication No. 9-33944 discloses a technique which reduces light entering the channel region using a light shield layer fabricated of a-Si (amorphous silicon) having a large refractive index. Furthermore, a light shield layer fabricated of a refractory metal, for example, is arranged on the TFT array substrate in a position facing the pixel switching TFT (i.e., beneath the TFT). The light shield layer mounted beneath the TFT prevents a rear surface reflection from the TFT array substrate, or prevents projection light coming in from another electro-optical device and penetrating a prism from entering the TFT of the electro-optic device when a plurality of liquid crystal devices are combined to form an optical system via the prism or the like.

SUMMARY OF THE INVENTION

In the conventional art, each of the above light shield techniques suffer from one or more of the following problems. The light shield layers arranged on the counter substrate and the TFT array substrate are not sufficient to block light entering the channel region of the thin-film transistor and the peripheral area of the thin-film transistor. Additionally, the light shield layer and the channel region are substantially spaced from each other in terms of interlayer distance, in 3-dimensional terms sandwiching a liquid-crystal layer, thee electrodes, and interlayer insulators therebetween. This structure fails to block light obliquely entering between the light shield layer and the channel region. In a compact electro-optical device used as a light valve in a projector, incident light from a light source is condensed, and a component of incident light entering at an oblique angle with respect to the electro-optical device is too large to be neglected. Insufficient light blocking against the obliquely entering light presents practical problems.

For example, light enters into the electro-optical device through an area having no light shield layer and is reflected from the light shield layer and the internal surface of the data line (i.e., the surface of the data line facing the channel region). Such light may be further reflected from the internal surfaces of the light shield layer and the data line, thereby becoming multiple reflections. The reflected light and resulting multiple reflections may reach the channel region of the TFT. In the technique of using the data line as the light shield layer, the data line is formed in a stripe and extends in a direction perpendicular to the scanning line in a plan view, and an interlayer insulator laminated between the data line and the channel region must be thick enough to reduce the adverse effect of capacitive coupling therebetween to a negligible level. Accordingly, in this arrangement, it can be difficult to assure sufficient light blocking.

In accordance with the technique disclosed by Japanese Unexamined Patent Application Publication No. 9-33944, an a-Si layer is deposited on a gate electrode, and the lamination of a relatively thick interlayer insulator between the gate electrode and the a-Si layer is required to reduce the adverse effect of capacitive coupling therebetween. As a result, the additional lamination of the a-Si layer and the interlayer insulator enlarges the laminate structure of the device, and it is still difficult to fully block obliquely entering light and internal reflections. To satisfy current consumers' demand for a higher quality display, high definition and high pixel pitch are required of the electro-optical device. As a higher definition display and a finer pixel pitch are introduced, the above-described light shield techniques have even more difficulty with assuring sufficient light blocking, and changes in the TFT transistor characteristics cause flickering, degrading the image quality of the electro-optical device.

To increase light resistance, the expansion of the formation area of the light shield layer has been contemplated. However, the expansion of the formation area of the light shield layer makes it difficult to heighten the aperture ratio of each pixel in an attempt to improve image brightness.

The light shield performance of the light shield layers formed on a counter substrate and a TFT array substrate is still not satisfactory. For example, the light shield layer having a light transmittance ratio of 0.1 to 0.01% is fabricated of Ti (titanium) or WSi (tungsten silicide). In the technique of using the data line as a light shield layer on the TFT array substrate, the light shield layer having a light transmittance ratio of 0.01% or so is typically fabricated of Al. Light from a light source of a projector is typically 10 M luxes or so. According to the study carried out by the inventors of this invention, the TFTs cause a photo-leakage current of 5E-11 [A] under light of 1000 luxes. As the electro-optical device has a higher definition and a finer pixel pitch to satisfy the consumers' demand, a photo-leakage current is generated even by a low level of light in the above-reference light shields. Specifically, a change in the transistor characteristics visibly degrades an image on a screen.

A preventive step of thickening the light shield layer and the data line for higher light shield capability has also been contemplated. However, if these layers are thickened, the laminate structure of the substrate suffers from stress, and a diversity of problems are then expected including a warp of the substrate, an increase of processing time for film formation and etching steps.

In the technique disclosed in Japanese Unexamined Patent Application Publication No. 9-33944, the light transmittance ratio of an a-Si layer is substantially higher than that of Ti, WSi, Al, etc. In the electro-optical device incorporating higher definition and finer pixel pitch designs, a light shield layer fabricated of a-Si cannot block light from a light source in a projector, in particular.

The present invention has been developed in view of the above problems, and it is a first object of the present invention to provide an electro-optical device which presents excellent light resistance, features a high aperture ratio in each pixel, and displays a high-quality image.

It is another object of the present invention to provide an electro-optical device which presents excellent light resistance with a thickness increase of a light shield layer controlled and displays a high-quality image.

To achieve the above objects, a first electro-optical device of the present invention can include a pair of substrates, an electro-optical material interposed between the pair of substrates, a plurality of pixel electrodes arranged in a matrix on one of the substrates, thin-film transistors respectively electrically connected to the pixel electrodes, an upper light shield layer having a crossing portion above the thin-film transistor on the one substrate, a lower light shield layer having a crossing portion beneath the thin-film transistor on the one substrate and formed within the formation area of the upper light shield layer, and a junction of a channel region of the thin-film transistor which is formed within an area in which the crossing portion of the upper light shield layer and the crossing portion of the lower light shield layer overlap each other.

In the first electro-optical device of the present invention, the upper light shield layer having the crossing portion above the thin-film transistor on the one substrate defines the non-aperture area of each pixel. The upper light shield layer thus blocks light leakage, thereby effectively preventing a drop in contrast ratio. The upper light shield layer having the crossing portion is arranged above the thin-film transistor, the lower light shield layer having the crossing portion is arranged beneath the thin-film transistor, and in the image display area in a plan view, the formation area of the lower light shield layer is placed within the formation area of the upper light shield layer. At least the junction of the channel region of the thin-film transistor (the junction of the channel region with each of a source region and a drain region, each formed of one of an N− region, an N+ region, a P− region, a P+ region, etc.) is arranged in the crossing portion of the lower light shield layer.

Thus, in such applications as a projector that use intense light, the upper light shield layer is capable of shielding the thin-film transistor not only from a light component of the incident light entering at a right angle with respect to the substrate, but also from a light component entering at an oblique angle with respect to the substrate, to the thin-film transistor. The lower light layer is capable of blocking optical feedback including light reflected on the rear surface of the electro-optical device and light coming out of a light valve and passing through an optical synthesizing system when a plurality of electro-optical devices are combined to use another light valve as in a multi-panel projector application. Light rays entering the sides of the upper light shield layer may be reflected from the surface of the lower light shield layer facing the upper light shield layer, possibly becoming internal reflections and multiple reflections. With the upper light shield layer overlapping the lower light shield layer, these internal reflections and multiple reflections are effectively avoided.

Studies carried out by the inventors of this invention show that a photo-leakage current most likely occurs when light is incident on the junction of the channel region of the thin-film transistor. The junction of the channel region of the thin-film transistor is arranged within the crossing portion of the light shield layer which excellently blocks light rays entering at an oblique angle from either above or below or from the sides (in other words, the crossing portion of the light shield layer is least exposed to the incident light). In this way, less light is incident, and less likely a photo-leakage current occurs. In comparison with a conventional light shield layer arranged on a counter substrate, the TFT is light shielded by relatively closely laminated light shield layers from above and from below. In this arrangement, the light shield performance of the device is increased without unnecessarily expanding the formation area of the light shield layer (in other words, without unnecessarily narrowing the aperture area of each pixel).

A high aperture ratio of each pixel, and a high light resistance reduce degradation in performance of the thin-film transistor due to a photo-leakage current. An electro-optical device having a high contrast ratio and providing a high image quality is thus provided.

In one embodiment of the first electro-optical device of the present invention, the upper light shield layer is formed in a grid-like configuration to define a non-aperture area of each pixel, and the lower light shield layer is formed in a grid-like configuration.

In this embodiment, the non-aperture area of each pixel for a pixel electrode is defined by the crossing portion of the upper light shield layer arranged over the thin-film transistor. The lower light shield layer is narrower in width of vertical and horizontal segments of each grid thereof than the upper light shield layer (by one notch). This arrangement assures a higher light shield performance.

In the above embodiment, the upper light shield layer includes at least one electrode of a storage capacitor, one electrode of which is electrically connected to the pixel electrode, and a data line electrically connected to the thin-film transistor. Since the one capacitor electrode forming the storage capacitor and the data line are used as the upper light shield layer in this embodiment, the laminate structure can be simplified.

The upper light shield layer is configured in a grid with the data line and capacitive line mutually intersecting, and at least the junction of the channel region of the thin-film transistor is arranged within the crossing portion of the data line and the capacitive line. The junction of the channel region of the thin-film transistor is placed within the crossing portion of the data line and the capacitive line, because the crossing portion provides the most effective light shield performance to the image display area against light rays entering at an oblique angle from either above or below or from the sides. This arrangement makes it less likely that a photo-leakage current will occur at the thin-film transistor.

In the above embodiment, a semiconductor layer of the thin-film transistor is formed within an area where the region of the data line and the region of the lower light shield layer overlap each other. Since the entire semiconductor layer of the thin-film transistor is light shielded in this embodiment, occurrence of a photo-leakage current can be even more controlled in the thin-film transistor.

In the above embodiment, the upper light shield layer includes a plurality of first light shield layers extending in a first direction, an insulator layer formed on the first light shield layers, and a plurality of second light shield layers formed on the insulator layer and intersecting the first light shield layers extending in the first direction.

In this embodiment, the upper light shield layer is formed of the first light shield layers and the second light shield layers that mutually intersect the first light shield layers in a grid-like configuration. The junction of the channel region of each thin-film transistor is placed within the crossing portion of the first and second light shield layers. The junction of the channel region of the thin-film transistor is placed within the crossing portion of the first light shield layer and the second light shield layer, because that crossing portion provides the most effective light shield performance to the image display area against light rays entering at an oblique angle from either above or below or from the sides . This arrangement makes it less likely that a photo-leakage current will occur in the thin-film transistor.

In the above-referenced embodiment, the first light shield layer may be at least one electrode of a storage capacitor, one electrode of which is electrically connected to the pixel electrode, and the second light shield layer may be a data line electrically connected to the thin-film transistor. Since the one capacitor electrode forming the storage capacitor and the data line are used as the upper light shield layer in this embodiment, the laminate structure of the device can be advantageously simplified.

In another embodiment of the first electro-optical device of the present invention, at least one of the upper light shield layer and the lower light shield layer may be formed of the same single light shield layer. Since the light shield layer is formed of the same single light shield layer, the laminate structure of the device is simplified.

In the above-referenced embodiment, the same single light shield layer may include a plurality of light shield crossing portions, each arranged over the thin-film transistor.

To make it possible that a photo-leakage current will occur less in the thin-film transistor, light shielding at least the junction of the channel region of the thin-film transistor is effective. It is perfectly acceptable that each thin-film transistor is light shielded by one crossing portion.

In the above-reference embodiment, a scanning line, electrically connected to the thin-film transistor, may be formed within the region of the lower light shield layer. In this case, the scanning line may be fabricated of a silicon layer of polysilicon, amorphous silicon, or monocrystal silicon, or fabricated of polycide or silicide.

Further, in this arrangement, the scanning line fabricated of a silicon layer of polysilicon, amorphous silicon, or monocrystal silicon, or fabricated of polycide or silicide does not behave like a glass fiber, and thus effectively prevents incident light rays or optical feedback from being guided to the channel region of the thin-film transistor.

In the above-referenced embodiment, the scanning line may be formed within the region of the upper light shield layer. Since the scanning line is formed within the region of the upper light shield layer in this embodiment, the aperture ratio of each pixel is improved.

In yet another embodiment of the first electro-optical device of the present invention, a semiconductor layer of the thin-film transistor includes a channel, a region which is heavily doped with an impurity, a region which is lightly doped with an impurity and is arranged between the channel and the heavily doped region, and the lightly doped region is formed within an area where the crossing portion of the upper light shield layer and the crossing portion of the lower light shield layer overlap each other.

In this embodiment, occurrence of a photo-leakage current is controlled in the thin-film transistor having an LDD structure.

In yet another embodiment of the first electro-optical device of the present invention, the edge of the lower light shield layer in a cross section perpendicular to the one substrate recedes from the edge of the upper light shield layer corresponding to the edge of the lower light shield layer by 10 degrees or more with respect to a line normal to the substrate.

In this embodiment, the edge of the lower light shield layer in a cross section perpendicular to the one substrate recedes from the edge of the upper light shield layer corresponding to the edge of the lower light shield layer by 10 degrees or more. As long as the incident angle of light rays entering the sides of the upper light shield layer is 10 degrees or less with respect to a line normal to the substrate, internal reflections and multiple reflections, which can be caused when the incident light ray is reflected from the surface of the lower light shield layer facing the upper light shield layer, are prevented. Since obliquely incident light rays at an incident angle of 10 degrees or larger are almost non-existent in the electro-optical device used in a general-purpose projector, the recession of the edge of the lower light shield layer by 10 degrees or larger is important.

On the other hand, setting the angle of recession of the edge of the lower light shield layer not to exceed 10 degrees by a large angle appropriately controls internal reflections and multiple reflections which can be caused when optical feedback passing by the edge of the lower light shield layer is reflected from the surface of the upper light shield layer facing the lower light shield layer.

In yet another embodiment of the first electro-optical device of the present invention, a counter light shield layer is arranged on the other substrate, opposed to the one substrate, within the formation area of the upper light shield layer in a plan view.

In this embodiment, the counter substrate is provided with another light shield layer in the structure in which the an electro-optical material such as a liquid crystal is interposed between the substrate bearing the thin-film transistors and the counter substrate. Since another light shield layer is placed within the formation area of the upper light shield layer in a plan view, this light shield layer has no function of defining the aperture area of each pixel. However, this light shield layer blocks unwanted light incidence on the counter substrate, thereby preventing a temperature rise in the electro-optical device. The light shield layer on the counter substrate blocks unwanted incident light rays to some degree, thereby reducing a incident light component that can later become internal reflections and multiple reflections. Consequently, degradation in the thin-film transistor performance is reliably reduced.

To resolve the previously described problem, a projection-type display apparatus of the present invention can include a light source, a light valve including the first electro-optical device, a light guide member for guiding light generated by the light source to the light valve, and a projection optical member for projecting light modulated by the light valve. Since this embodiment prevents a photo-leakage current from occurring in the thin-film transistor in the electro-optical device, the projection-type display apparatus projects a high-quality image on a screen.

To resolve the previously described problem, a second electro-optical device of the present invention includes a pair of substrates, an electro-optical material interposed between the pair of substrates, a plurality of pixel electrodes arranged in a matrix on one of the substrates, thin-film transistors respectively electrically connected to the pixel electrodes, a light shield layer which is arranged over the plurality of thin-film transistors on the one substrate and is a laminate of a light absorption sublayer and a light shield sublayer, the light absorption sublayer being formed on the side of the light shield layer facing the thin-film transistors, and the light shield sublayer being formed on the side of the light shield layer opposite to the plurality of thin-film transistors, a data line electrically connected to the thin-film transistor and intersecting the light shield layer, and a junction of a channel region of the thin-film transistor which is formed within an area in which the light shield layer overlaps the data line.

In the second electro-optical device of the present invention, the data line and a main line portion of the light shield layer intersect each other above at least the channel region of the thin-film transistor connected to the pixel electrode. The electrically conductive data line having a light shield property and the light shield layer dually light shield the channel region of the thin-film transistor. If the electro-optical device is used so that the side on which the data line and the light shield layer are formed faces in the direction of incident light rays (such as projection light of a projector), the channel region of the thin-film transistor is dually blocked from the incident light rays. If the data line permitting light to be slightly transmitted (at a light transmittance ratio of 0.1%, for example) because of its thin thickness and the light shield layer permitting light to be slightly transmitted (at a light transmittance ratio of 0.1%, for example) because of its thin thickness are used together, high light shield performance (a light transmittance of 0.00001 to 0.000001%, for example) is achieved.

The light absorption sublayer of the light shield layer facing the thin-film transistor absorbs light rays passing by the thin-film transistor from the substrate and reaching the internal surface of the light shield layer (i.e., light rays reflected from the rear surface of the electro-optical device, and optical feedback coming out of another electro-optical device and passing through a light synthesizing system in a multi-panel projector which uses a plurality of electro-optical devices as light valves). The light shield layer is a multilayer formed of the light shield sublayer on the external side thereof (facing in a direction opposite to the thin-film transistor) and the light absorption sublayer on the internal side thereof (facing the thin-film transistor). The light shield sublayer is fabricated of a metal layer, such as of Al film or Cr film, having a high reflectance. The light shield layer enhances the light shield capability against light rays incident thereon, while reducing internal reflections generated within the light shield layer. As a result, light reaching the channel region of the thin-film transistor is reduced.

If a thick light shield layer is laminated on the substrate, the substrate can warp as a result of stress. Furthermore, if the size of surface irregularity and steps on the topmost layer serving as an underlayer of the pixel electrode is large in this type of electro-optical device, the electro-optical device suffers more from operational faults (such as orientation defects of the liquid crystal). If the laminate structure on the substrate is too thick, routing electrical connection to the pixel electrode becomes difficult. Accordingly, thickening the light shield layer to be embedded into the substrate and the entire laminate structure is basically undesirable. Required light shield performance is attained by laminating the two thin films, even if the two thin films individually are unable to assure sufficient light shield performance. Further, a layer other than a dedicated light shield layer is advantageously used as a light shield layer. Particularly, when the electro-optical device is used in projectors, which handle high intensity light, a high light shield capability is generally required. The dual light shielding construction in the crossing portion is effective.

The data line prevents light rays, incident at an oblique angle with respect to the substrate, from entering the channel region of the thin-film transistor. The light shield layer (extending in a direction perpendicular to the data line) prevents light rays, incident at an oblique angle with respect to the substrate, from entering the channel region of the thin-film transistor. Most of intense incident light rays enters at a right angle to the surface of the substrate, and the obliquely incident light rays have typically modest intensity, causing internal reflections and multiple reflections in the electro-optical device. The light shield performance level required to prevent the right-angle incident light rays is not so rigorous as that required to prevent the obliquely incident light rays. The obliquely incident light rays are effectively blocked by the data line and the light shield layer (even if it is a single layer).

As a result, even when high intensity light is used, a photo-leakage current due to the admission of light to the channel region of the transistor are prevented, and degradation in the transistor performance can be effectively avoided. The use of the light shield layer and the data line controls light leakage, thereby preventing a drop in contrast ratio. The aperture area of each pixel is also defined (therefore, the light shield layer conventionally arranged on the counter substrate may be dispensed with).

In comparison with a conventional light shield layer arranged on a counter substrate, the TFT is light shielded by relatively closely laminated light shield layers from above and from below. In this arrangement, the light shield performance of the device is improved without unnecessarily expanding the formation area of the light shield layer (in other words, without unnecessarily narrowing the aperture area of each pixel).

While the thickness increase of the light shield layer is controlled, light resistance is increased. It is less likely that a photo-leakage current will occur, thereby preventing degradation in the performance of the thin-film transistor. Accordingly, an electro-optical device having a high contrast ratio and providing a high image quality is thus provided.

In yet another embodiment of the second electro-optical device of the present invention, the light shield layer is arranged between the data line and the thin-film transistor. In this embodiment, the junction of the channel region of the thin-film transistor is covered with the light shield layer and then with the data line. High light shield performance is thus achieved. Since the light shield layer is interposed between the data line and the channel region, the adverse effect of capacitive coupling between the data line and the channel region can be reduced.

In still another embodiment of the second electro-optical device of the present invention, the data line is arranged between the light shield layer and the thin-film transistor. Since the junction of the channel region of the thin-film transistor is covered with the data layer and then with the light shield layer, high light shield performance can be achieved.

In the above-reference embodiment, a light absorption layer may be laminated on the data line on the side thereof facing the thin-film transistor. Since internal reflections and multiple reflections are absorbed by the light absorption layer of the data line in the electro-optical device, degradation in the thin-film transistor performance due to a photo-leakage current is reduced.

In yet another embodiment of the second electro-optical device of the present invention, the light shield layer may form a storage capacitor, one electrode of which is electrically connected to the pixel electrode.

The light shield layer has not only the function of light shielding, but also the function of serving as a pixel-potential capacitor electrode of the storage capacitor in this embodiment. The overall thickness of the light shield layer is controlled. This arrangement effectively precludes both a complex laminate structure and a complex manufacturing process of the laminate structure, which can result from a separate arrangement of a light shield layer and a storage capacitor.

In the above-referenced embodiment, the storage capacitor may include a capacitor electrode formed of the light absorption layer facing the thin-film transistor, a capacitor electrode formed of the light shield layer and opposed to the capacitor electrode of the light absorption layer, and a dielectric layer interposed between the two capacitor electrodes.

In this embodiment, the storage capacitor has not only the function of a capacitor, but also the function of light shielding and light absorption. This arrangement effectively precludes both a complex laminate structure and a complex manufacturing process of the laminate structure, which can result from a separate arrangement of a light shield layer and a storage capacitor.

In the above-referenced embodiment, a light absorption layer may be laminated on the capacitor electrode of the light shield layer on the surface of the capacitor electrode facing the thin-film transistor.

In this embodiment, the capacitor electrode of the light absorption layer and the light absorption layer formed on the capacitor electrode of the light shield layer absorb light of internal reflections and multiple reflections in the electro-optical device. Therefore, even if light leaks through the light shield layer of the capacitor electrode, the two light absorption layers reliably absorb light.

In yet another embodiment of the second electro-optical device of the present invention, the light shield layer may be connected to a constant-voltage line in a peripheral area surrounding a pixel display area in which the pixel electrode is arranged.

Since the light shield layers respectively facing the channel region and the data line are connected to a constant voltage in this embodiment, the channel region is free from the adverse effect resulting from variations in the voltage of the light shield layer. The light shield layer connected to the constant voltage in the peripheral area precludes the need for a complex laminate structure which can be required if the light shield layer is connected to the constant voltage within the image display area. Since the light shield layer also serves as fixed-potential capacitor electrode, a reliable storage capacitor is formed by connecting the light shield layer to the constant voltage. The constant voltage power source to which the light shield layer is connected may be a positive or negative constant voltage power source which feeds power to peripheral circuits for driving the thin-film transistor, or may be a constant voltage source for supplying power to a counter electrode on the counter substrate.

Another embodiment of the second electro-optical device of the present invention further includes a lower light shield layer arranged in a grid-like configuration beneath the plurality of thin-film transistors on the one substrate, wherein the lower light shield layer is formed within the formation area of the upper light shield layer, and covers a junction of the channel region of the thin-film transistor.

The lower light shield layer in this arrangement blocks optical feedback coming in from below the thin-film transistor. The thin-film transistor is thus light shielded from below and above. The lower light shield layer is formed of a single metal layer, an alloy layer, a metal silicide layer, a polysilicide layer, or a multilayer of these layer, each layer fabricated of at least a refractory metal selected from the group consisting of Ti, Cr, W, Ta, Mo, and Pb.

To resolve the previously described problem, a projection-type display apparatus of the present invention includes a light source, a light valve including the second electro-optical device, a light guide member for guiding light, generated by the light source, to the light valve, and a projection optical member for projecting light modulated by the light valve.

Since this embodiment prevents a photo-leakage current from occurring in the thin-film transistor in the electro-optical device, the display apparatus projects an high-quality image on a screen.

The thin-film transistor of the present invention may be of a top gate type in which the gate electrode, formed of part of the scanning line, is arranged over the channel region of the thin-film transistor, or may be of a bottom gate type in which the gate electrode, formed of part of the scanning line, is beneath the channel region of the thin-film transistor. The interlayer level of the pixel electrode may be above or below the scanning line on the substrate.

BRIEF DESCRIPTION OF THE DRAWINGS

The invention is described in detail with reference to the following Figures, wherein like numerals reference like elements, and wherein.

DETAILED DESCRIPTION OF PREFERRED EMBODIMENTS

Figure 1:
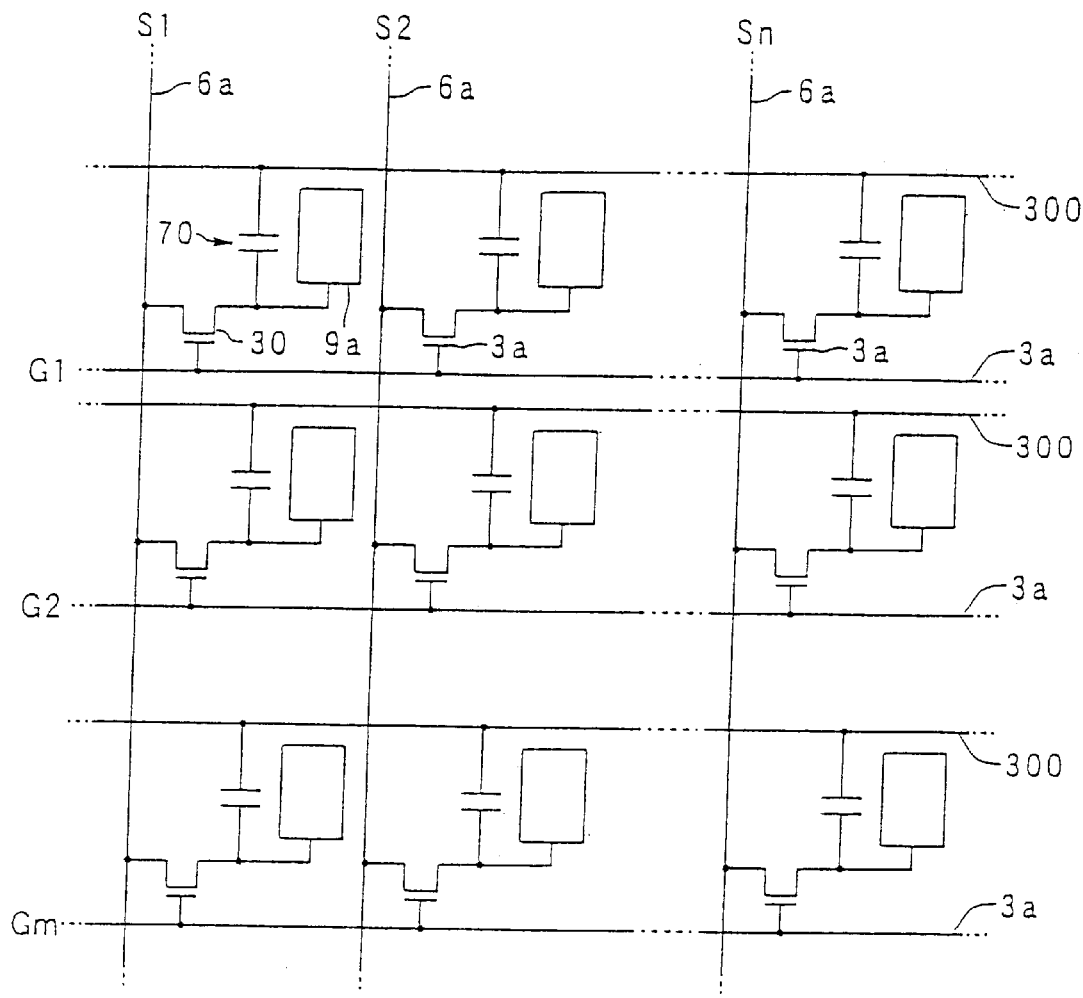
FIG. 1 is an exemplary circuit of a variety of elements and wirings of a plurality of pixels arranged in a matrix that constitute an image display area in the electro-optical device of a first embodiment of the present invention.

The embodiments of the present invention are now discussed, referring to the drawings. In the following embodiments, and for the purposes of discussion only, the electro-optical device of the present invention is applied to a liquid-crystal device.

Figure 2:
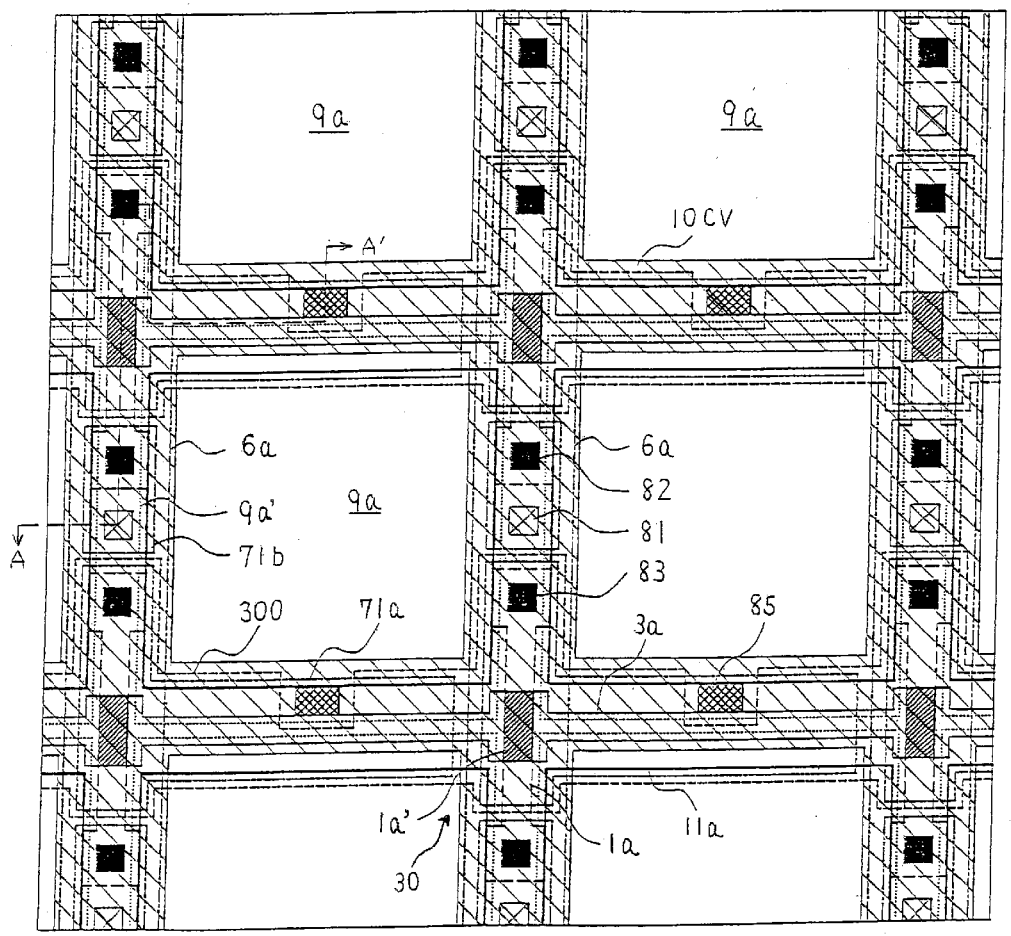
FIG. 2 is a plan view of a plurality of pixels adjacent to each other in a TFT array substrate of the first embodiment of the electro-optical device having data lines, scanning lines, and pixel electrodes formed thereon.
Figure 3:
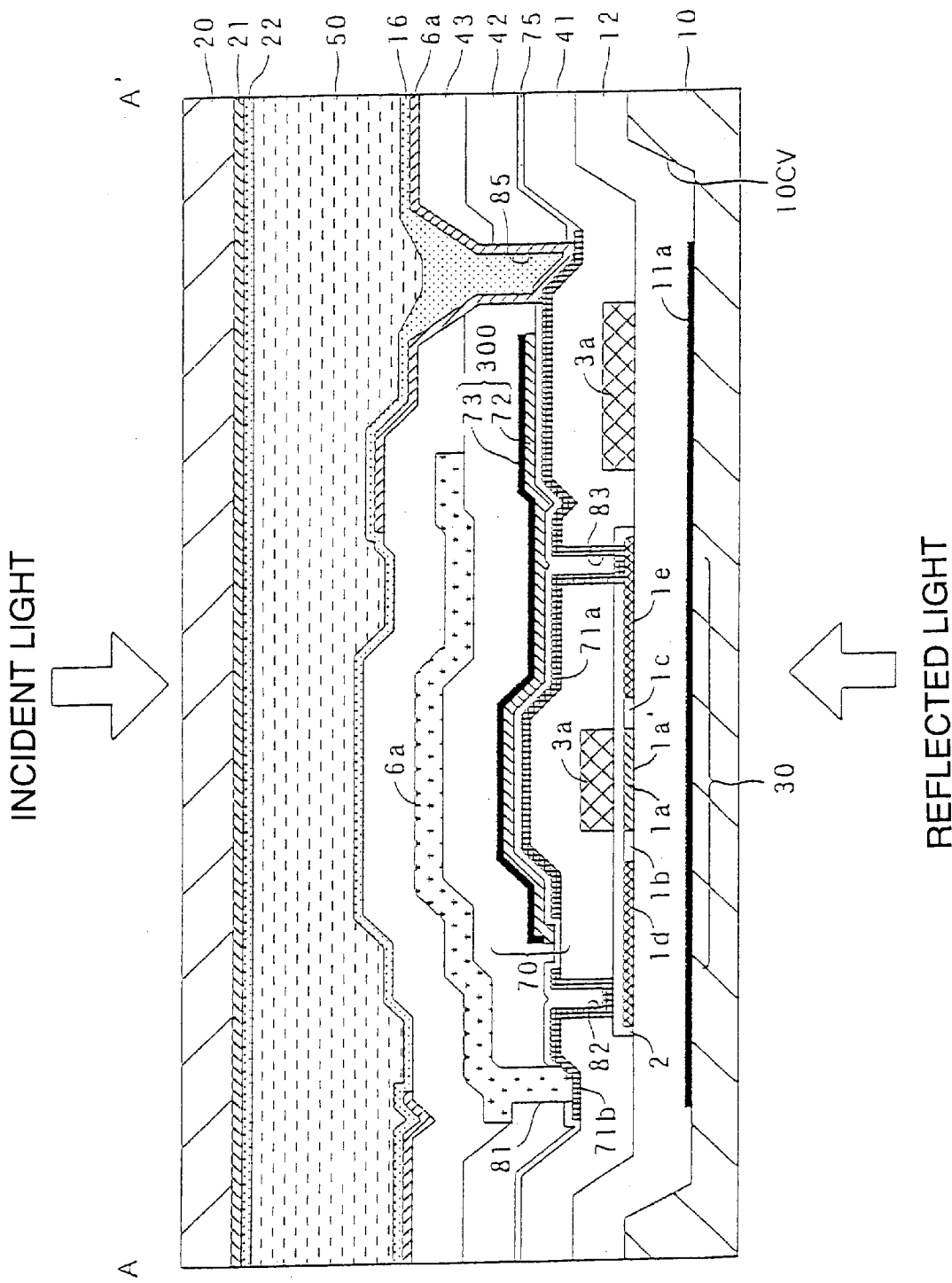
FIG. 3 is a cross-sectional view of the electro-optical device taken along line A—A' in FIG. 2.

The construction of the electro-optical device of a first embodiment of the present invention is shown in FIG. 1 through FIG. 3. FIG. 1 is an exemplary circuit diagram showing elements and wirings in a matrix of pixels forming an image display area in the electro-optical device. FIG. 2 is a plan view showing a plurality of pixels arranged side by side in a TFT array substrate that bears data lines, scanning lines, and pixel electrodes. FIG. 3 is a sectional view of the TFT array substrate taken along line A—A' in FIG. 2. Referring to FIG. 3, layers and members are drawn to different scales for easy identification.

Referring to FIG. 1, a plurality of pixels are formed in a matrix forming an image display area for the electro-optical device according to the first embodiment, each pixel having a pixel electrode 9a and a TFT 30 for switch-controlling the pixel 9a, and a data line 6a to which image signals are supplied is electrically connected to the source of the TFT 30. Image signals S1, S2, . . . , Sn are supplied to the data lines 6a on a line by line basis in that order, or may be supplied to several adjacent data lines 6a at a time on a group by group basis. A scanning line 3a is electrically connected to the gate of each TFT 30. The scanning signals G1, G2, . . . , Gm are applied successively to the scanning lines 3a in pulse form in that order at predetermined timings. The pixel electrode 9a is electrically connected to the drain of the TFT 30.

With the TFT 30s as a switching element closed for a predetermined period of time, the image signals S1, S2, . . . , Sn supplied by the data lines 6a are written at predetermined timings. The image signals S1, S2, . . . , Sn at predetermined levels written into liquid crystal as an electro-optical material via the pixel electrodes 9a are stored with respect to a counter electrode (to be discussed later) formed in a counter substrate (to be discussed later) for a certain period of time. The liquid crystal modulates light to provide gray scale display by changing the orientation or order of a set of molecules in response to an applied voltage level. In the normally white mode, transmittance ratio to incident light is reduced in response to a voltage supplied to each pixel, while in the normally black mode, transmittance ratio to incident light is increased in response to a voltage supplied to each pixel, and as a result, the electro-optical device outputs light bearing a contrast responsive to the image signal. To prevent the stored video signal from leaking, a storage capacitor 70 is added in parallel with the capacitor of the liquid crystal formed between the pixel electrode 9a and the counter electrode.

Referring to FIG. 2, the TFT array substrate of the electro-optical device includes a matrix of transparent pixel electrodes 9a (with the outlines thereof represented by broken lines 9a'). The data line 6a, and the scanning line 3a run respectively vertically and horizontally along each pixel electrode 9a.

The scanning line 3a is arranged to face the channel region 1a' of a semiconductor layer 1a represented by a portion hatched with rightwardly upwardly inclined lines. The scanning line 3a functions as a gate electrode (in this embodiment, the scanning line 3a has a wider portion serving as the gate electrode). Arranged at each intersection of the scanning line 3a and the data line 6a in this way is a TFT 30 having the channel region 1a' with the scanning line 3a serving as the gate electrode and facing the channel region 1a'. The scanning line 3a is fabricated of a silicon layer of polysilicon, amorphous silicon, or monocrystal silicon, or fabricated of polycide or silicide.

Referring to FIG. 2 and FIG. 3, a storage capacitor 70 is formed by disposing so that an intermediate conductor layer 71 a, serving as a pixel potential capacitor electrode and connected to a heavily doped drain region 1e (and the pixel electrode 9a) of the TFT 30, and part of a capacitive line 300 as a fixed-potential capacitor electrode face each other via a dielectric layer 75. The capacitive line 300, serving as a fixed-potential capacitor electrode, is a laminate of a first sublayer 72 fabricated of an electrically conductive polysilicon layer, an amorphous silicon layer or a monocrystal silicon layer and a second sublayer 73 fabricated of a metal silicide containing a refractory metal.

The storage capacitor also functions as a light shield layer. The intermediate conductor layer 71a has light absorption properties that are higher than that of the second sublayer 73, and functions as a light absorption layer interposed between the second sublayer 73 and the TFT 30. The capacitive line 300 itself functions as a light shield layer. The first sublayer 72, formed of a polysilicon layer, has the function of a light absorption layer interposed between the second sublayer 73 and the TFT 30. The second sublayer 73, formed of a metal silicide layer containing a refractory metal, has the function of light shield layer for shielding the TFT 30 from incident light. Specifically, incident light rays are blocked by the second sublayer 73, and light rays entering between the second sublayer 73 and the TFT 30 are absorbed by the intermediate conductor layer 71a and the first sublayer 72.

In a plan view, the capacitive line 300 extends in a stripe configuration along the scanning line 3a, and projects upward and downward in an area overlapping the TFT 30 as shown in FIG. 2. The TFT 30 is arranged on the TFT array substrate 10 in an area where each of the vertically extending data lines 6a and each of the horizontally extending capacitive lines 300 intersect each other as shown in FIG. 2. The TFT 30 is therefore light shielded by both the data line 6a and the capacitive line 300 as one of embedded light shield layers, if viewed from the counter substrate. The upper light shield layer in a grid-like configuration in a plan view is thus formed of the mutually intersecting data lines 6a and capacitive lines 300.

A lower light shield layer 11a is arranged in a grid-like configuration beneath the TFT 30 on the TFT array substrate 10.

In the first embodiment, the grid-like upper light shield layer (the capacitive line 300 and the data line 6a) defines the non-aperture area of each pixel. The formation area of the grid-like lower light shield layer 11a is placed within the formation area of the grid-like the upper light shield layer (in other words, the width across the lower light shield layer 11a is narrower than the width across each of the capacitive line 300 and the data line 6a by one notch). The semiconductor layer 1a of the TFT 30, including the junctions with the lightly doped source region 1b and the light doped drain region 1c (i.e., LDD areas), is placed within the crossing portion of the grid-like lower light shield layer 11a (i.e., within the crossing portion of grid-like upper light shield layer).

The second sublayer 73, forming a portion of the upper light shield layer, and the lower light shield layer 11a can be formed of a single metal layer, an alloy layer, a metal silicide layer, a polysilicide layer, or a multilayer of these layer, each layer fabricated of at least a refractory metal selected from the group consisting of Ti, Cr, W, Ta, Mo, Pb, and Al. The capacitive line 300 has a multilayer structure, with the first sublayer 72 thereof being fabricated an electrically conductive polysilicon. It is thus not necessary to manufacture the second sublayer 73 of an electrically conductive layer. However, if not only the first sublayer 72 but also the second sublayer 73 is fabricated of an electrically conductive layer, the capacitive line 300 becomes lower in electrical resistance. At any rate, at least one of the first sublayer 72 and the second sublayer 73, constituting the capacitive line 300, is formed of a light shield layer forming the upper light shield layer.

Referring to FIG. 3, the dielectric layer 75, interposed between the intermediate conductor layer 71a and the capacitive line 300 as the capacitor electrodes, is formed of a relatively thin HTO layer or LTO layer having a thickness falling within a range from 5 to 200 nm, such as of a silicon oxide layer, a silicon nitride layer, a nitride oxide layer, or a multilayer of these layers. As long as the reliability of the dielectric layer 75 is assured, the thinner the dielectric layer 75, the better from the standpoint of increasing the capacitance of the storage capacitor 70.

The first sublayer 72, which functions not only as a light absorption layer but also as one portion of the capacitive line 300, is formed of a polysilicon layer or an amorphous silicon layer or a monocrystal silicon layer, each having a thickness falling within a range from 50 nm to 150 nm. The second sublayer 73, which functions not only as a light shield layer but also as the other portion of the capacitive line 300, is formed of a tungsten silicide layer having a thickness of approximately 150 nm. The first sublayer 72, which remains in contact with the dielectric layer 75, is formed of a silicon layer, and the intermediate conductor layer 71a, which is also in contact with the dielectric layer 75, is formed a polysilicon layer or an amorphous silicon layer or a monocrystal silicon layer. This arrangement can prevent the dielectric layer 75 from being deteriorated. If a metal silicide layer is in contact with the dielectric layer 75, metal such as of heavy metal enters the dielectric layer 75, thereby degrading the dielectric layer 75. When the capacitive line 300 is produced on the dielectric layer 75, the quality of the dielectric layer 75 is improved if the capacitive line 300 is formed without a photoresist step involved, subsequent to the formation of the dielectric layer 75. The dielectric layer 75 is thus formed into a thin film, thereby increasing the capacitance of the storage capacitor 70.

Referring to FIG. 2 and FIG. 3, the data line 6a is connected to an intermediate conductor layer 71b through a contact hole 81. The intermediate conductor layer 71b, in turn, is electrically connected to a heavily doped source region 1d of the semiconductor layer 1a, fabricated of a polysilicon layer, through the contact hole 82. The intermediate conductor layer 71b is formed of the same layer as that of the intermediate conductor layer 71a.

The capacitive line 300 extends along the image display area in which the pixel electrode 9a is arranged, and is electrically connected to a constant voltage power source for a constant voltage level. Available as the constant voltage power source in this case may be a negative-voltage power source or a positive-voltage power source for a scanning line driving circuit (to be described later) for feeding a scanning signal to the scanning line 3a to drive the TFT 30 and a data line driving circuit (to be described later) for controlling a sampling circuit that feeds an image signal to the data line 6a, or may be a constant voltage fed to the counter electrode on the counter substrate.

Like the capacitive line 300, preferably, the lower light shield layer 11a arranged beneath the TFT 30 is routed along the image display area and is connected to a constant voltage source to avoid the adverse effect arising from variations in the voltage of the lower light shield layer 11a.

Referring to FIG. 2 and FIG. 3, the pixel electrode 9a is electrically connected to an heavily doped drain region 1 e of the semiconductor layer 1a through the intermediate conductor layer 71a and contact holes 83 an 85. Besides the function of the pixel-potential capacitor electrode of the storage capacitor 70 and the light absorption layer, the intermediate conductor layer 71a has the function of connecting the pixel electrode 9a to the TFT 30 in this embodiment. The intermediate conductor layer 71a is fabricated of the same electrically conductive layer (for example, a silicon layer of polysilicon, amorphous silicon, or monocrystal silicon) as that of the intermediate conductor layer 71b. The intermediate conductor layer 71a and the intermediate conductor layer 71b are used as an intermediate conductor layer. Even if an interlayer distance between the pixel electrode 9a and the semiconductor layer 1a forming the TFT 30 is as long as 1000 nm to 2000 nm, two relatively small diameter contact holes connected in series connect the pixel electrode 9a to the semiconductor layer 1a in an excellent condition, in a manner free from any technical difficulty such as of connecting the pixel electrode 9a and the semiconductor layer 1a using a single contact hole. The aperture ratio of the pixel is thus increased. Etching through is prevented during the opening of the contact hole.

Referring again to FIG. 2 and FIG. 3, the electro-optical device includes a transparent TFT array substrate 10 and a transparent counter substrate 20 opposed to the TFT array substrate 10. The TFT array substrate 10 can be fabricated of a quartz substrate, a glass substrate, or a silicon substrate, for instance, and the counter substrate 20 can be fabricated of a glass substrate or a quartz substrate, for instance.

A trench 10 cv is formed in the TFT array substrate 10 in a grid area in a plan view (hatched with rightwardly downwardly inclined lines as shown FIG. 2). The wirings and elements such as the scanning line 3a, the data line 6a, and the TFT 30 are placed in the trench 10 cv. This arrangement reduces the size of a step between an area where neither wirings nor elements are present and an area where the wirings and the elements are arranged, consequently reducing image defects such as orientation defects of the liquid crystal due to such steps.

Referring to FIG. 3, the TFT array substrate 10 is provided with the pixel electrodes 9a, and arranged on top of them is an alignment layer 16 which has been subjected to a predetermined rubbing process. The pixel electrode 9a can be fabricated of a transparent, electrically conductive film, such as an ITO (Indium Tin Oxide) film. The alignment layer 16 can be fabricated of an organic thin film, such as a polyimide thin film.

The counter substrate 20 has a counter electrode (common electrode) 21 extending on the entire surface thereof, and an alignment layer 22 therebeneath that has been subjected to a predetermined rubbing process. The counter electrode 21 can be fabricated of a transparent, electrically conductive film, such as an ITO film. The alignment layer 22 is fabricated of an organic thin film such as a polyimide thin film.

A grid-like or striped light shield layer may be arranged on the counter substrate 20. Together with the upper light shield layer of the capacitive line 300 and the data line 6a, this light shield layer reliably shields the channel region 1a', the lightly doped source region 1b, and the lightly doped drain region 1c from incident light coming from the direction of the counter substrate 20. Furthermore, the light shield layer of the counter substrate 20 prevents a temperature rise in the electro-optical device by imparting a high reflectivity to the surface of the light shield layer on which light is incident. The light shield layer of the counter substrate 20 is preferably placed within the formation area of the upper light shield layer of the capacitive line 300 and the data line 6a. In this way, the light shield layer of the counter substrate 20 blocks light and prevents a temperature rise without reducing the aperture ratio of each pixel.

In this arrangement, a liquid crystal is encapsulated in a gap surrounded by a sealing material between the TFT array substrate 10 and the counter substrate 20 arranged with the pixel electrodes 9a facing the counter electrode 21. A liquid-crystal layer 50 is thus formed. The liquid-crystal layer 50 takes a predetermined orientation state by the alignment layer 16 and the alignment layer 22 with no electric field applied by the pixel electrode 9a. The liquid-crystal layer 50 can be formed of a mixture of one or several types of nematic liquid crystals. The sealing material is an adhesive agent made of a thermal setting agent or a photosetting agent for bonding the TFT array substrate 10 to the counter substrate 20 along the edges thereof, and is mixed with spacers such as glass fiber or glass beads to keep a predetermined distance between the two substrates.

An underlayer insulator 12 is arranged beneath the pixel switching TFT 30. The underlayer insulator 12 has the function of insulating the TFT 30 from the lower light shield layer 11a. Since the underlayer insulator 12 is formed on the entire surface of the TFT array substrate 10, the underlayer insulator 12 has the function of preventing the performance of the pixel switching TFT 30 from being degraded by surface irregularity of the TFT array substrate 10 caused during a polishing process or dirt left after a cleaning operation.

Referring to FIG. 3, the pixel switching TFT 30 has an LDD (Lightly Doped Drain) structure, and includes the scanning line 3a, the channel region 1a' of the semiconductor layer 1a in which a channel is formed by the electric field from the scanning line 3a, the thin insulating layer 2 for insulating the scanning line 3a from the semiconductor layer 1a, the lightly doped source region 1b and the lightly doped drain region 1c of the semiconductor layer 1a, and the heavily doped source region 1d and the heavily doped drain region 1e of the semiconductor layer 1a.

As shown, arranged on the scanning line 3a is a first interlayer insulator 41 in which the contact hole 82 leading to the heavily doped source region 1d and the contact hole 83 leading to the heavily doped drain region 1e are formed.

Formed on the first interlayer insulator 41 are the intermediate conductor layer 71a, the intermediate conductor layer 71b, the dielectric layer 75, and the capacitive line 300, and formed on these layers are a second interlayer insulator 42 in which a contact hole 81 and a contact hole 85 respectively leading to the intermediate conductor layer 71b and the intermediate conductor layer 71a are opened.

In this embodiment, the first interlayer insulator 41 may be fired at a temperature of 1000° C. to activate ions implanted into the polysilicon layer (or a silicon layer of amorphous silicon, or monocrystal silicon) forming the semiconductor layer 1a and the scanning line 3a. On the other hand, the second interlayer insulator 42 is unfired to alleviate stress taking place in the border thereof with the capacitive line 300.

The data line 6a is formed on the second interlayer insulator 42, and formed on these layers is a third interlayer insulator 43 in which the contact hole 85 leading to the intermediate conductor layer 71a is opened. The pixel electrode 9a is arranged on the third interlayer insulator 43. The alignment layer 16 is deposited on the pixel electrode 9a.

In the first embodiment thus constructed, light rays entering the channel region 1a' of the TFT 30 and its vicinity from the direction of the counter substrate 20 are blocked by the grid-like upper light shield layer formed of the data line 6a and the capacitive line 300 (particularly the second sublayer 73 thereof). On the other hand, optical feedback entering the channel region 1a' of the TFT 30 and its vicinity from the TFT array substrate 10 is blocked by the lower light shield layer 11a (this arrangement is very effective because optical feedback coming from another electro-optical device and passing through a prism is intense in a multi-panel color projector or the like in which a plurality of electro-optical devices are combined through the prisms or the like to form an optical system).

For example, when the light shield layer of the counter substrate 20, which is spaced with interlayer distance from the TFT 30, blocks the obliquely incident light rays or light rays of internal reflections and multiple reflections that are generated when optical feedback falls at an oblique angle on the data line 6a of Al having a high reflectance, and on an internal surface of the second layer fabricated of a refractory metal having a relatively high reflectance, namely the surface facing the TFT 30, the light shield performance of the light shield layer can be limited.

In comparison, in the first embodiment, the TFT 30 is light shielded by the capacitive line 300, the data line 6a, and the lower light shield layer 11a, all of which are laminated relatively closer to the semiconductor layer 1a in interlayer distance. The internal reflections and the multiple reflections are absorbed by the first sublayer 72 and the intermediate conductor layer 71a as the light absorption layers. As a result, the TFT 30 is free from performance degradation, and the electro-optical device provides an extremely high light resistance.

In this embodiment, the first sublayer 72 and the intermediate conductor layer 71a as the light absorption layers can be fabricated of an electrically conductive, polysilicon layer (or a silicon layer of amorphous silicon). The channel region is also formed of a polysilicon layer (or a silicon layer of amorphous silicon) not doped or doped with P, B, or As for controlling a threshold voltage Vth. These light absorption layers therefore have a light absorption property similar or identical to the (frequency-dependent) light absorption property of the channel region. The first sublayer 72 and the intermediate conductor layer 71a advantageously absorb light components centered at the frequency of light which can be absorbed by the channel region 1a' and can cause a photo-leakage current. Light absorption effect is thus enhanced by fabricating the channel region of the TFT and the light absorption layer of the same base material.

In the electro-optical device of the first embodiment, as discussed above, the data line 6a intersects the capacitive line 300 as one embedded light shield layer over the TFT 30, the TFT 30 is dually light shielded. When the data line fabricated of an Al layer having a light transmittance ratio of 0.1%, for example, and the capacitive line 300 including the second sublayer 73 fabricated of a refractory metal having a light transmittance ratio of 0.1% are used at the same time, the two layers dually light shield, thereby resulting in an extremely low light transmittance ratio of 0.00001 to 0.000001%. The data line 6a and the capacitive line 300, which are so thin that the two lines individually may not attain required light shield performance, are dually laminated to obtain a required light shield performance level.

Since the data line 6a and the capacitive line 300 have additional functions besides the light shield function, the TFT array substrate 10 remains thin and simple in the laminate structure thereof. The data line 6a (extending in a vertical direction in FIG. 2) prevents light rays, incident at an oblique angle with respect to the substrate, from entering the channel region 1a' of the TFT 30. The capacitive line 300 (extending in a horizontal direction in FIG. 2) blocks light rays, incident at an oblique angle with respect to the substrate, from entering the channel region 1a' of the TFT 30.

The capacitive line 300 as one example of the embedded light shield layer is beneath the data line 6a in this embodiment. Since the capacitive line 300 at the constant potential is interposed between the data line 6a and the channel region 1a', the adverse effect of capacitive coupling between the data line 6a and the channel region 1a' is controlled.

Figure 4:
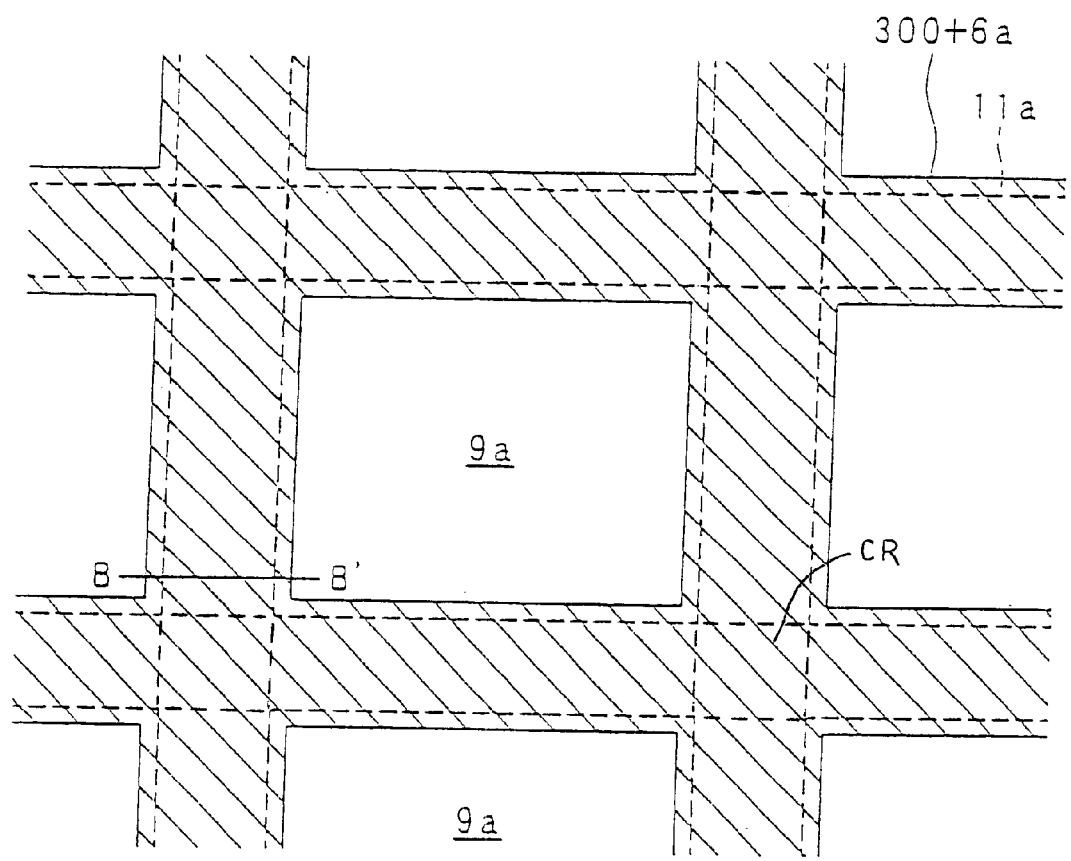
FIG. 4 is a plan view of pixels of the TFT array substrate, showing only an upper light shield layer and a lower light shield layer of the first embodiment.
Figure 5:
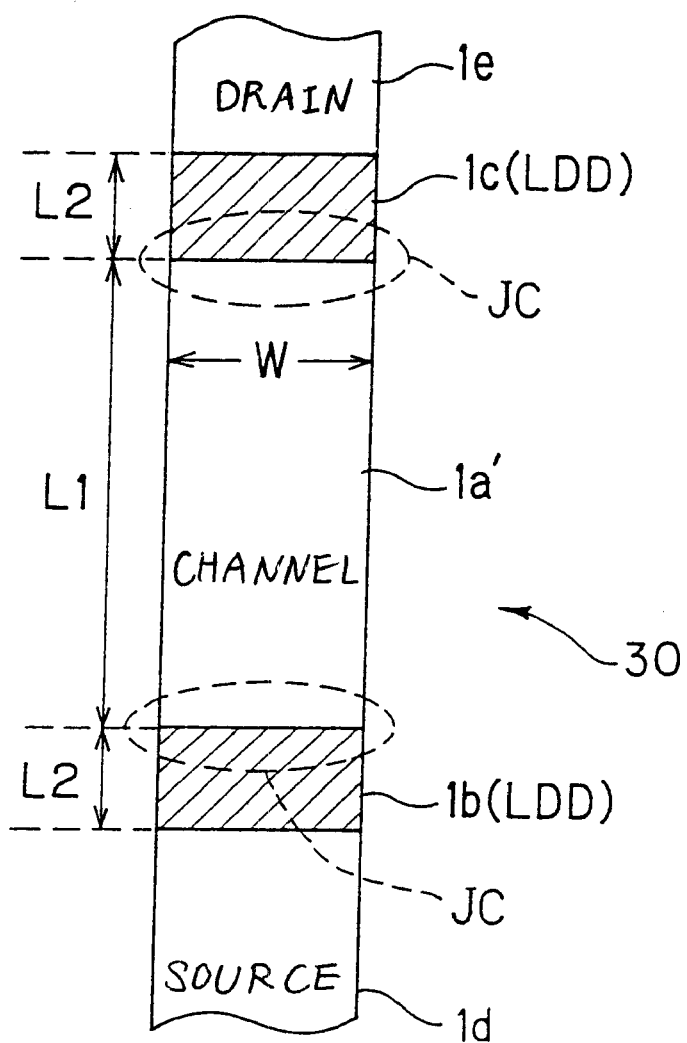
FIG. 5 is a plan view showing, in enlargement, the channel region of a TFT in the first embodiment.
Figure 8:
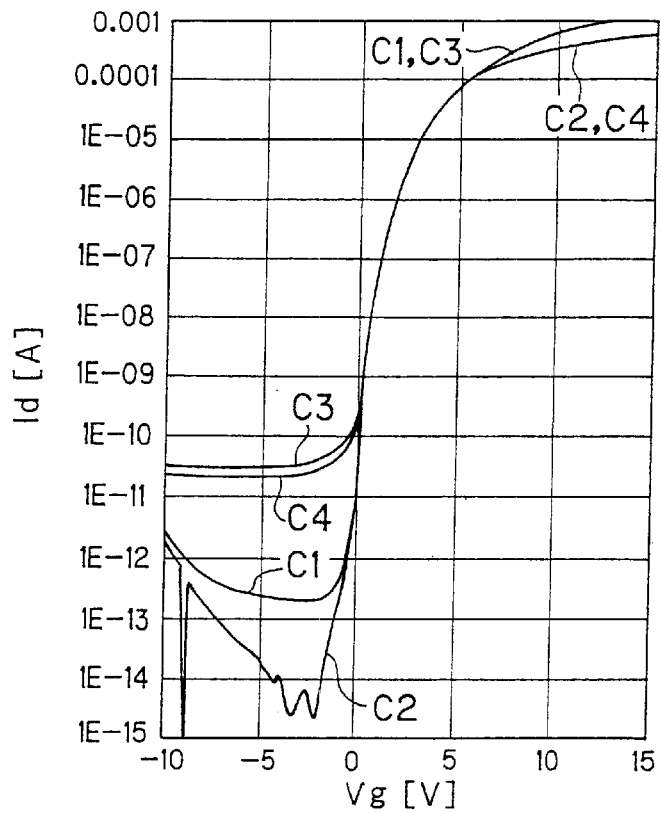
FIG. 8 shows a characteristic chart (3) of the TFT, plotting the relationship between the gate voltage and drain current thereof when a channel width W of the TFT is changed.
Figure 9:
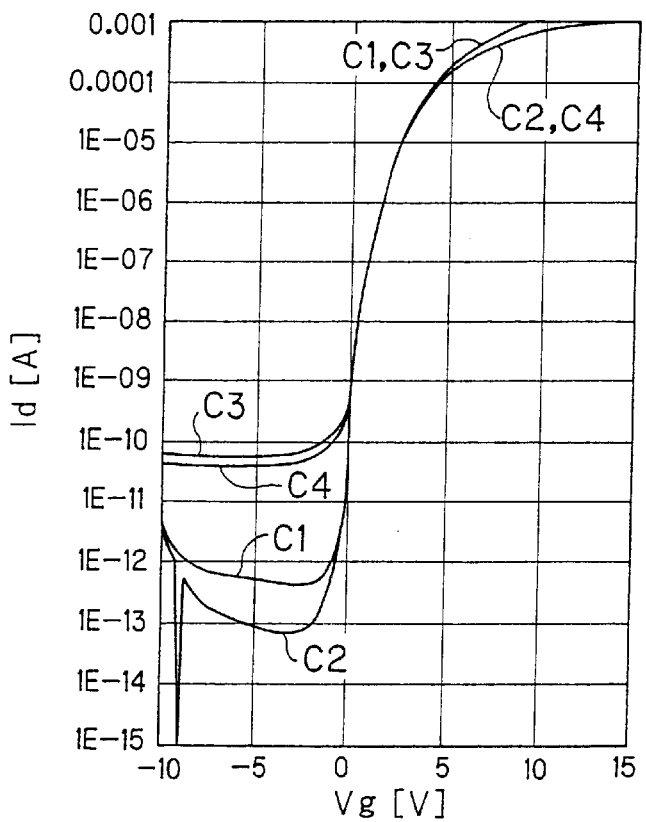
FIG. 9 shows a characteristic chart (4) of the TFT, plotting the relationship between the gate voltage and drain current thereof when a channel width W of the TFT is changed.
Figure 10:
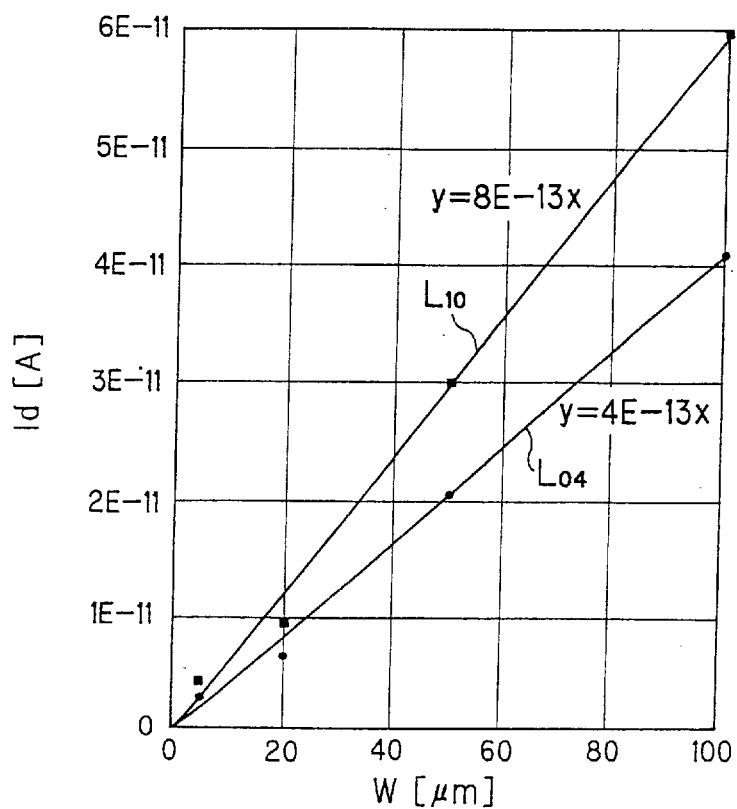
FIG. 10 shows a characteristic chart of the TFT, plotting the relationship between the channel width W and the current of the TFT.
Figure 11:
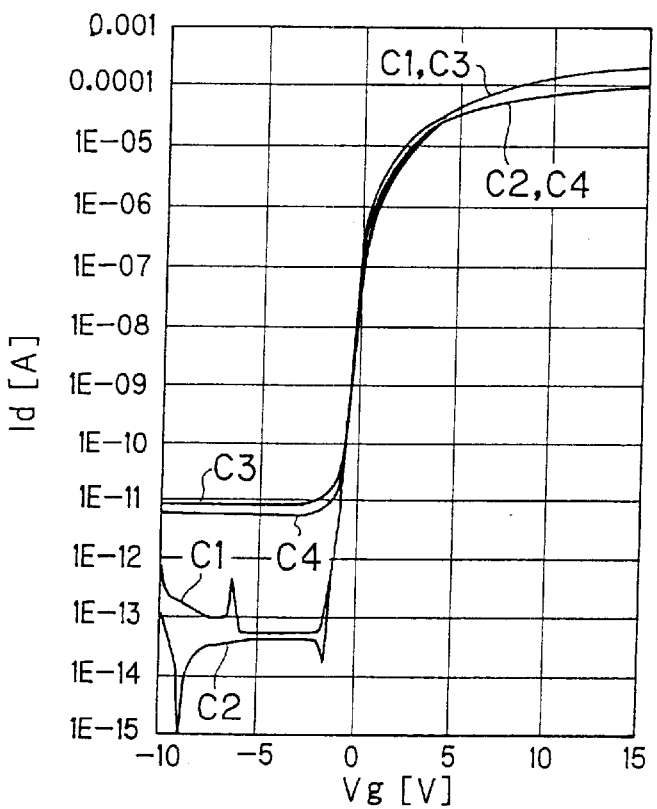
FIG. 11 shows a characteristic chart (1) of the TFT, plotting the relationship between the gate voltage and drain current thereof when one of a channel length L1 and an LDD length L2 is changed with the channel width W of width.
Figure 12:
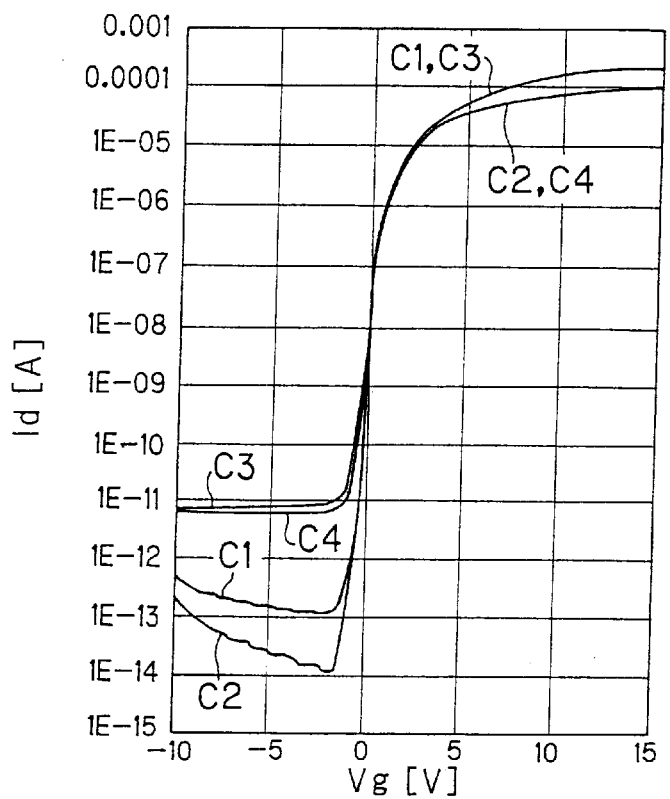
FIG. 12 shows a characteristic chart (2) of the TFT, plotting the relationship between the gate voltage and drain current thereof when one of a channel length L1 and an LDD length L2 is changed with the channel width W of the TFT fixed in width.
Figure 13:
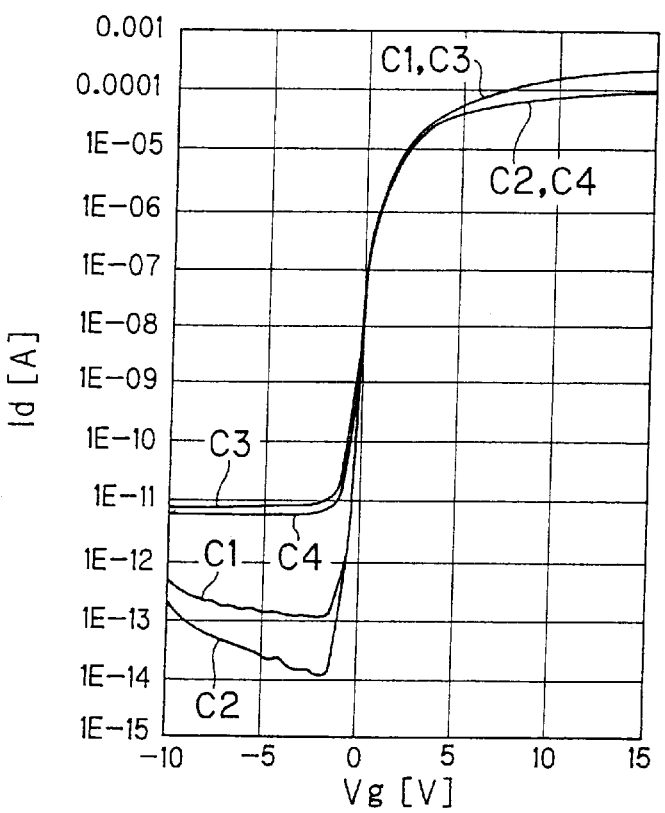
FIG. 13 shows a characteristic chart (3) of the TFT, plotting the relationship between the gate voltage and drain current thereof when one of a channel length LI and an LDD length L2 is changed with the channel width W of the TFT fixed in width.
Figure 14:
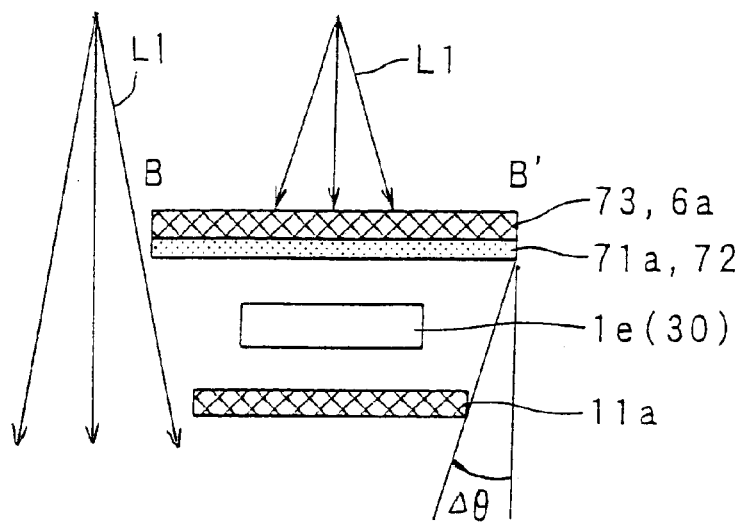
FIG. 14 is a cross-sectional view (1) graphically showing the light shielding conditions by the upper light shield layer and the lower light shield layer in a cross-section B—B' in FIG. 4.
Figure 15:
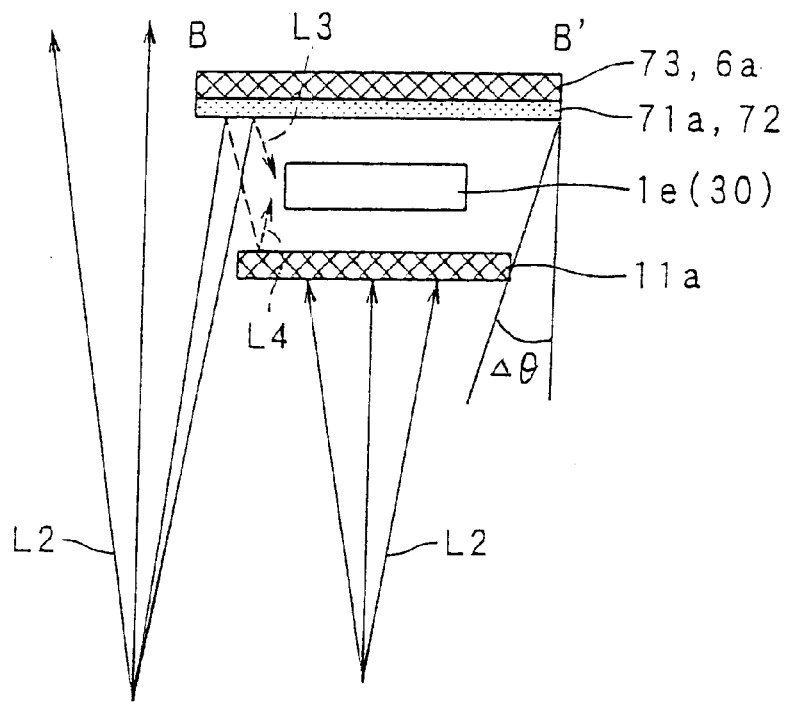
FIG. 15 is a cross-sectional view (2) graphically showing the light shielding conditions by the upper light shield layer and the lower light shield layer in a cross-section B—B' in FIG. 4.

Referring to FIG. 4 through FIG. 15, a light shielding operation of the present embodiment is further discussed. FIG. 4 is a plan view of pixels of the TFT array substrate, showing only the upper light shield layer and the lower light shield layer in the image display area in enlargement, and FIG. 5 is a plan view showing, in enlargement, the channel region of the TFT 30. FIG. 6 through FIG. 9 are characteristic charts of the TFT, plotting the relationship between the gate voltage and drain current thereof when a channel width W of the TFT is changed. FIG. 10 is a characteristic chart of the TFT, plotting the relationship between the channel width W and the current of the TFT. FIG. 11 through FIG. 13 are characteristic charts of the TFT, plotting the relationship between the gate voltage and drain current thereof when one of a channel length L1 and an LDD length L2 is changed with the channel width W of the TFT fixed in width. FIG. 14 and FIG. 15 are cross-sectional views graphically showing the light shielding conditions by the upper light shield layer and the lower light shield layer in a cross-section B—B' in FIG. 4.

Referring to FIG. 4, in this embodiment, the non-aperture area of each pixel is mainly defined by the upper light shield layer formed of the capacitive line 300, and the data line 6a (in an area which is clear of the capacitive line 300 to accommodate the contact holes 81 and 82). The upper light shield layer thus controls light leakage, thereby effectively preventing a drop in contrast ratio. The upper light shield layer is arranged above the TFT 30, while the grid-like lower light shield layer 11a is arranged beneath the TFT 30. The formation area of the lower light shield layer 11a is placed within the formation area of the upper light shield layer in a plan view.

Referring to FIG. 5, the junction JC of the channel region of the TFT 30 is placed within the crossing portion CR of the lower light shield layer 11a shown in FIG. 4. When a high-intensity light ray, such as the one used in a projector, is incident on the electro-optical device in the present embodiment, the upper light shield layer blocks, to the TFT 30 (particularly, the junction JC thereof), not only light rays entering at a right angle but also light rays entering at an oblique angle with respect to the TFT array substrate 10. Accordingly, optical feedback can be reliably blocked by the lower light shield layer 11a.

Studies carried out by the inventors of this invention show that it is most likely that a photo-leakage current will occur when light rays are incident on the junction JC of the channel region 1a' of the TFT 30. This finding will be further discussed, referring to FIG. 6 through FIG. 13.

The TFTs 30 having the LDD structure (having a channel length L1 of 5 mm and an LDD length L2 of 1.5 mm) are prepared. The relationship between the gate voltage and the drain current of the TFT 30 is examined in each of the following four conditions: (1) the TFT 30 is unexposed to light with the drain voltage at 10 V, (2) the TFT 30 is unexposed to light with the drain voltage at 4 V, (3) the TFT 30 is exposed to light with the drain voltage of 10 V, and (4) the TFT 30 is exposed to light with the drain voltage at 4 V.

Figure 6:
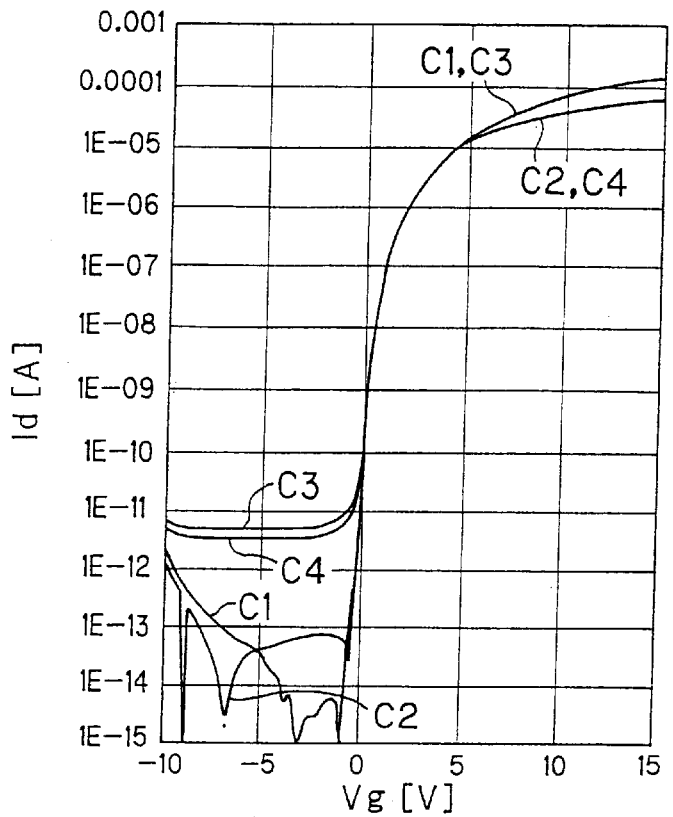
FIG. 6 shows a characteristic chart (1) of the TFT, plotting the relationship between the gate voltage and drain current thereof when a channel width W of the TFT is changed.
Figure 7:
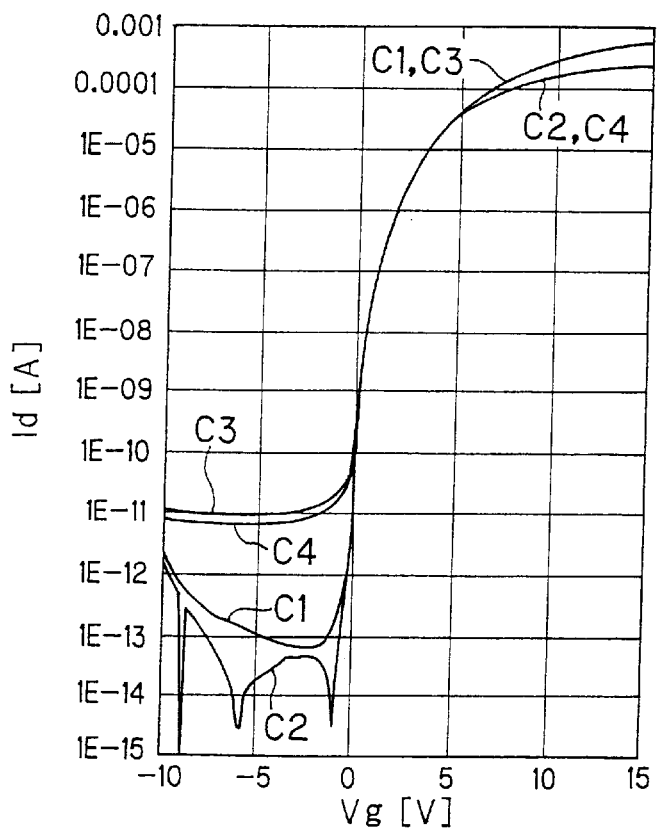
FIG. 7 shows a characteristic chart (2) of the TFT, plotting the relationship between the gate voltage and drain current thereof when a channel width W of the TFT is changed.

The test results of the TFT 30 with a channel width W of 5 mm are plotted as shown in FIG. 6 (as shown, characteristic curves corresponding to the four conditions are represented by C1, C2, C3, and C4). The test results of the TFT 30 with a channel width W of 20 mm are plotted as shown in FIG. 7 (as shown, characteristic curves corresponding to the four conditions are represented by C1, C2, C3, and C4). The test results of the TFT 30 with a channel width W of 50 mm are plotted as shown in FIG. 8 (as shown, characteristic curves corresponding to the four conditions are represented by C1, C2, C3, and C4). The test results of the TFT 30 with a channel width W of 100 mm are plotted as shown in FIG. 9 (as shown, characteristic curves corresponding to the four conditions are represented by C1, C2, C3, and C4). FIG. 10 shows the relationship between the channel width W and the current under the two of the four conditions in which the TFT 30 is exposed (as shown, a characteristic curve $L_{10}$ shows test results with the drain voltage set at 10 V and a characteristic curve $L_{04}$ shows test results with the drain voltage at 4 V). FIG. 10 also shows currents (i.e., leakage photocurrents here) of the TFT 30 with the drain voltage between −8 V to −5 V with the TFT 30 exposed to light.

FIG. 11 through FIG. 13 show the relationship between the gate voltage and the drain current of the TFT 30 with the channel width W=15 mm. The channel length L1 and the LDD length L2 are changed as follows: the channel length L1=4 mm and the LDD length L2=1.5 mm in FIG. 11, the channel length L1=2 mm and the LDD length L2=1.5 mm in FIG. 12, and the channel length L1=2 mm and the LDD length L2=1.0 mm in FIG. 13.

Referring to FIG. 11 through FIG. 13, characteristic curves corresponding to the above-mentioned four conditions are respectively represented by C1, C2, C3, and C4. The characteristic curves shown in FIG. 6 through FIG. 9 are different from the characteristic curves shown in FIG. 11 through FIG. 13 in terms of the drain currents over a gate voltage range from 5 V to 15 V. This is because the metals used in the source electrodes are different. Specifically, a contact resistance between the source electrode and the heavily doped source region becomes higher. This is unrelated to the leakage photocurrents which are a major concern of the present invention.

Figure 16:
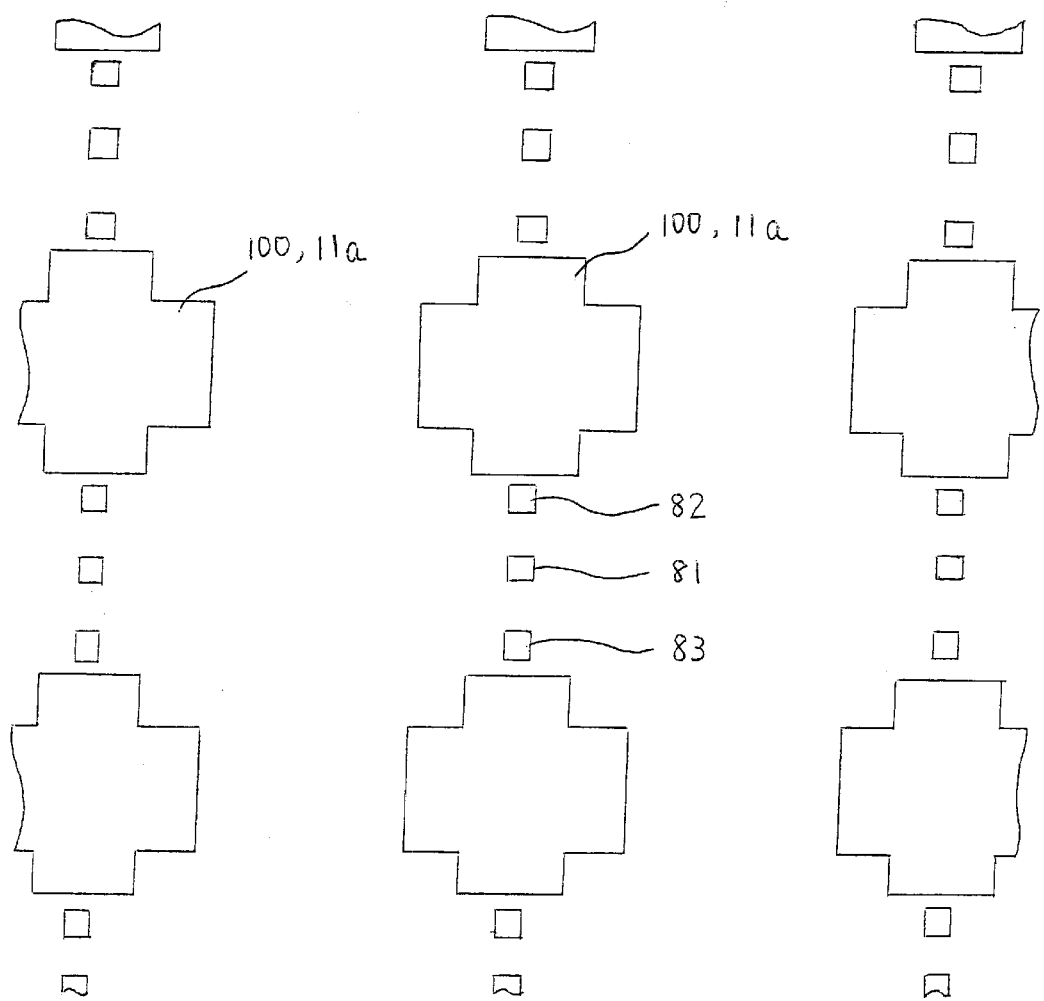
FIG. 16 is a plan view showing the upper light shield layer and the lower light shield layer in a second embodiment of the present invention.
Figure 17:
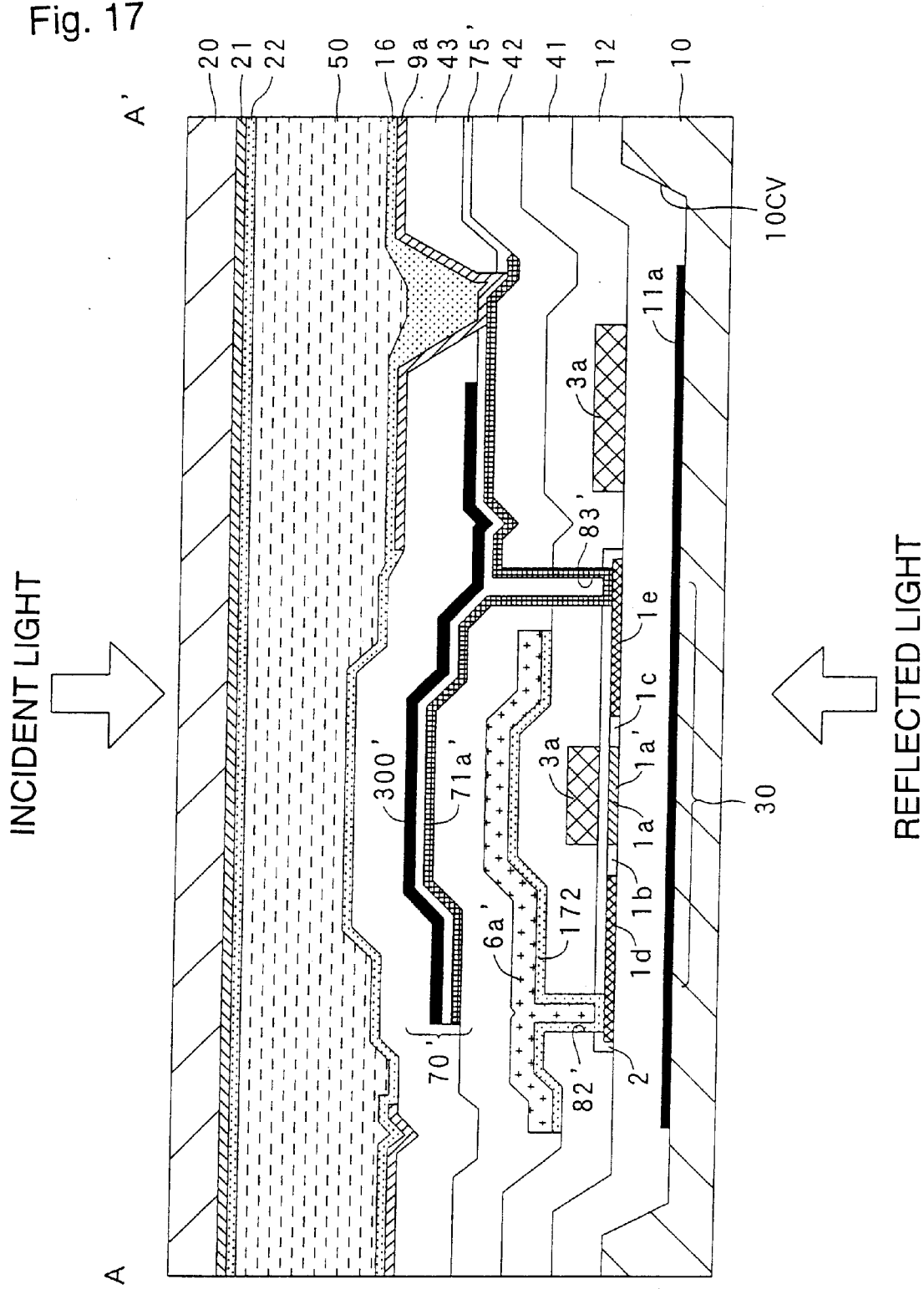
FIG. 17 is similar to the cross-section A—A' shown in FIG. 2, but showing the electro-optical device of a third embodiment of the present invention.

There is almost no difference between leakage photocurrents between FIG. 11 and FIG. 12. Specifically, it is considered that a change in the channel length L1 (see FIG. 5) results in almost no change in leakage photocurrents. A comparison of FIG. 16 with FIG. 17 shows that there is almost no change between leakage photocurrents. Therefore, it can be concluded that a change in the LDD length L2 (see FIG. 5) results in almost no change in the leakage photocurrents.

From FIG. 6 through FIG. 13, it can be seen that a change in the channel width W substantially changes the leakage currents even if exposure dose of light, the channel length L1, and the LDD length L2 are fixed. In other words, photocurrents are generated in the junction JC of the channel region 1a' shown in FIG. 5. It is thus considered that a reduction in the intensity of light exposed to the junction JC effectively controls the leakage photocurrents.

In this embodiment, the junction JC (see FIG. 5) of the channel region 1a' of the TFT 30 is positioned within the crossing portion CR (see FIG. 4) of the grid-like lower light shield layer 11a which is the least exposed to incident light in the image display area. This arrangement effectively sets the TFT 30 almost free from the generation of photocurrents in response to incident light. Since the TFT 30 is light shielded from above and below by closely laminated light shield layers, the light shield performance of the device is improved without unnecessarily expanding the formation area of the light shield layer (in other words, without unnecessarily narrowing the aperture area of each pixel).

In accordance with this embodiment, the formation area of the lower light shield layer 11a is positioned within the formation area of the upper light shield layer, i.e., the capacitive line 300 and the data line 6a as shown in FIG. 4. This arrangement prevents light rays entering the sides of the upper light shield layer from being reflected from the top surface of the lower light shield layer 11a, thereby effectively controlling internal reflections and multiple reflections. This mechanism will be discussed in greater detail with reference to FIG. 14 and FIG. 15.

Referring to FIG. 14, preferably, the edge of the lower light shield layer 11a in a B—B' cross section shown in FIG. 4 recedes from the edge of the capacitive line 300 forming the upper light shield layer by 10 degrees or more with respect to a line normal to the substrate. Specifically, the laminate structure is designed so that an angle of recession Dq of the lower light shield layer 11a preferably is 10 degrees or more as shown in FIG. 14 and FIG. 15.

When the angle at which a light ray L1 obliquely enters the TFT array substrate 10 is 10 degrees or less, the light ray L1 entering the sides of the capacitive line 300 including the intermediate conductor layer 71a, the first sublayer 72, and the second sublayer 73 is not reflected from the lower light shield layer 11a. Internal reflections and multiple reflections are thus effectively controlled. Since there is almost no light ray L1 that enters at a recession angle in excess of 10 degrees in an electro-optical device used in an ordinary projector, the setting of an angle of recession Dq to be 10 degrees or more is effective. However, when significant obliquely incident light rays L1 entering at an angle of up to 15 degrees are predicted in the specifications and design of a device, the lower light shield layer 11a may be designed to have an angle of recession Dq equal to or greater than 15 degrees.

Referring to FIG. 15, the angle of recession Dq of the lower light shield layer 11a does not exceed 10 degrees by a large angle, and a portion of optical feedback L2 passing by the edge of the lower light shield layer 11a, being reflected from the underside of the capacitive line 300, and becoming internal reflections L3 and multiple reflections L4 is reduced to a proper level.

In this embodiment, the lower light shield layer 11a is set to be narrower in width than the upper light shield layer by one notch, and the optical feedback L2 passing by the edge of the lower light shield layer 11a is reflected by the internal surface of the upper light shield layer. The optical feedback L2 is substantially lower in intensity than the incident light ray L1. The adverse effect of the internal reflections L3 and the multiple reflections L4 arising from the optical feedback L2 is marginal in comparison with the adverse effect arising from the incident light ray L1. Although the internal reflections L3 and the multiple reflections L4 arising from the optical feedback L2 can slightly take place, the present embodiment suppresses the generation of the internal reflections and the multiple reflections arising from the incident light ray L1 as much as possible. The present embodiment thus advantageously makes it less likely that a photo-leakage current will occur.

In the first embodiment described above, the capacitive line 300 including the second sublayer 73 and the data line 6a blocks the incident light ray L1 entering the electro-optical device from above, thereby preventing the incident light ray L1 from reaching the TFT 30 as shown in FIG. 14. Referring to FIG. 6, the lower light shield layer 11a blocks the optical feedback L2 entering the electro-optical device (i.e., from the exit side of the incident light ray L1) from below. The lower light shield layer 11a thus prevents the optical feedback L2 from reaching the TFT 30. Since the lower light shield layer 11a is sized to be smaller in width than the second sublayer 73 and the data line 6a in the capacitive line 300 by one notch, an obliquely entering portion of the optical feedback L2 passes by the lower light shield layer 11a and travels on to the internal surface of the upper light shield layer, particularly to the internal surface of the capacitive line 300. The light absorption layers, i.e., the first sublayer 72 of the capacitive line 300 and the intermediate conductor layer 71a are interposed between the upper light shield layer (i.e., the second sublayer 73 and the data line 6a) and the TFT 30. These light absorption layers absorb the obliquely entering portion of the optical feedback L2, and the internal reflections L3 and the multiple reflections L4, which are created when the obliquely entering portion of the optical feedback L2 is reflected from the upper light shield layer (i.e., the second sublayer 73 of the capacitive line 300 and the data line 6a).

A light absorption layer may also be deposited on the internal surface of the lower light shield layer 11a. In this arrangement, an obliquely incident light ray reaching the internal surface of the lower light shield layer 11a, and internal reflections and multiple reflections arising from the obliquely incident light ray may be absorbed by that light absorption layer.

In the first embodiment, the scanning line 3a formed of a polysilicon layer having electrical conductivity is formed along itself within the formation area of the lower light shield layer 11a. This arrangement prevents incident light rays and optical feedback from entering the scanning line 3a formed of a polysilicon layer (or at least a layer containing silicon) and from traveling within the scanning line 3a (from traveling as if in an optical fiber). The incident light rays and optical feedback are unable to reach the channel region 1a' of the TFT 30 and the peripheral region thereof.

In accordance with the first embodiment, the aperture ratio of each pixel is increased, and the light resistance of the TFT 30 is heightened. The TFT 30 is prevented from being degraded in performance because of a photo-leakage current. Accordingly, the electro-optical device thus presents a high-contrast, bright and high-quality image.

In the above-described embodiment, the capacitive line 300 including the fixed-potential capacitor electrode of the storage capacitor 70 is an embedded light shield layer. Alternatively, the pixel-potential capacitor electrode of the storage capacitor 70 may serve as an embedded light shield layer. The intermediate conductor layer for connecting the pixel electrode 9a to the TFT 30 may serve as an embedded light shield layer. In either case, the pixel-potential capacitor electrode or the intermediate conductor layer may be formed of an electrically conductive light shield layer fabricated of a refractory metal layer.

In the above-described first embodiment, as shown in FIG. 3, the trench 10 cv in the TFT array substrate 10 reduces the size of a step that is caused in regions on the underlayer of the pixel electrode 9a (i.e., the surface of the third interlayer insulator 43) along the data line 6a and the scanning line 3a when a number of electrically conductive layers are laminated as shown in FIG. 3. In addition to or instead of the trench 10 cv, planarization may be performed by trenching each of the underlayer insulator 12, the first interlayer insulator 41, the second interlayer insulator 42, and the third interlayer insulator 43, and by placing the wirings such as the data line 6a and the TFT 30 there. The steps on the third interlayer insulator 43 and the second interlayer insulator 42 may be polished away through a CMP (Chemical Mechanical polishing) process. Alternatively, an organic SOG may be used to planarize the laminate structure.

In the embodiment described above, the pixel switching TFT 30 preferably has the LDD structure shown in FIG. 3. Alternatively, the pixel switching TFT 30 may have an offset structure in which no impurity ion implantation is performed on the lightly doped source region 1b and the lightly doped drain region 1c, or may have a self-aligned type TFT in which a high dose impurity ion is implanted with part of the gate electrode 3a being used as a mask, to form heavily doped source and drain in a self-alignment process.

In this embodiment, the gate electrode of the pixel switching TFT 30 is of a single gate structure in which a single gate is interposed between the heavily doped source region 1d and the heavily doped drain region 1e. However, alternatively, more than one gate electrode may be interposed therebetween. With dual gates or triple gates employed in a TFT, leakage currents in junctions between the channel region and the source region and between the channel region and the drain region are prevented, and thereby a current during off period is reduced.

A second embodiment of the present invention will now be discussed, referring to FIG. 16. FIG. 16 is a plan view of the upper light shield layer and the lower light shield layer.

In the first embodiment, the upper light shield layer is composed of the data line 6a and the capacitive line 300. In the second embodiment, a separate upper light shield layer 100 is arranged between the storage capacitor 70 and the thin-film transistor 30. The upper light shield layer 100 is formed like a cross-shaped island. Arranged between upper light shield layers 100 are a contact hole 82 connecting the heavily doped source region 1d to the intermediate conductor layer 71b, a contact hole 81 connecting the intermediate conductor layer 71b to the data line 6a, and a contact hole 83 connecting the heavily doped drain region 1e to the intermediate conductor layer 71a.

The upper light shield layer 100 is formed overlapping the channel region 1a', the lightly doped source region 1b, the light doped drain region 1c, a portion of the heavily doped source region 1d, and a portion of the heavily doped drain region 1e of the semiconductor layer 1a.

The upper light shield layer 100 has a double layer structure like the capacitive line 300 in the first embodiment. The upper light shield layer 100 includes a top light shield sublayer and, as a bottom layer facing the TFT 30, a light absorption sublayer. In this case, the storage capacitor 70 may have the same construction as that of the first embodiment, or may be fabricated of a light transmissive material. The capacitive line 300 of the storage capacitor 70 may be a light shield layer, while the upper light shield layer 100 may serve as a light absorption layer only.

The cross-shaped island light shield layer may be formed as the lower light shield layer 11a. In this case, the cross-shaped island light shield layer may be arranged in the same manner as in the first embodiment.

A third embodiment of the present invention will now be discussed, referring to FIG. 17. FIG. 17 is similar to the cross-section A—A' shown in FIG. 2, but showing the electro-optical device of the third embodiment of the present invention. In FIG. 17 showing the third embodiment, components identical to those described with reference to FIG. 3 showing the first embodiment are designated with the same reference numerals, and the discussion of these components will be omitted.

In the electro-optical device of the third embodiment shown in FIG. 17, the data line 6a' is laminated below a storage capacitor 70' formed of a capacitive line 300', an intermediate conductor layer 71a' serving also as a pixel-potential capacitor electrode, and a dielectric layer 75'. In this arrangement, a contact hole 82' connects the data line 6a' to a heavily doped source region 1d, and a contact hole 83' connects the intermediate conductor layer 71a' to a heavily doped drain region. As described with reference to FIG. 4, FIG. 14, and FIG. 15, a light absorption layer 172 is deposited on the internal surface of the data line 6a' to reduce internal reflections from the data line 6a'. The remaining construction of the third embodiment remains similar to that of the first embodiment already discussed with reference to FIG. 1 through FIG. 3.

In accordance with the third embodiment, a high light shield performance can be achieved because the channel region 1a' of the TFT 30 is covered with the data line 6a' and is further covered with the capacitive line 300' as one example of the light shield layer. Light rays reaching the internal surface of the data line 6a' is absorbed by the light absorption layer 172. Light shield performance against light rays incident on the data line 6a' and the capacitive line 300' is enhanced, while internal reflections generated are reduced by the internal layer of the data line 6a'.

Figure 18:
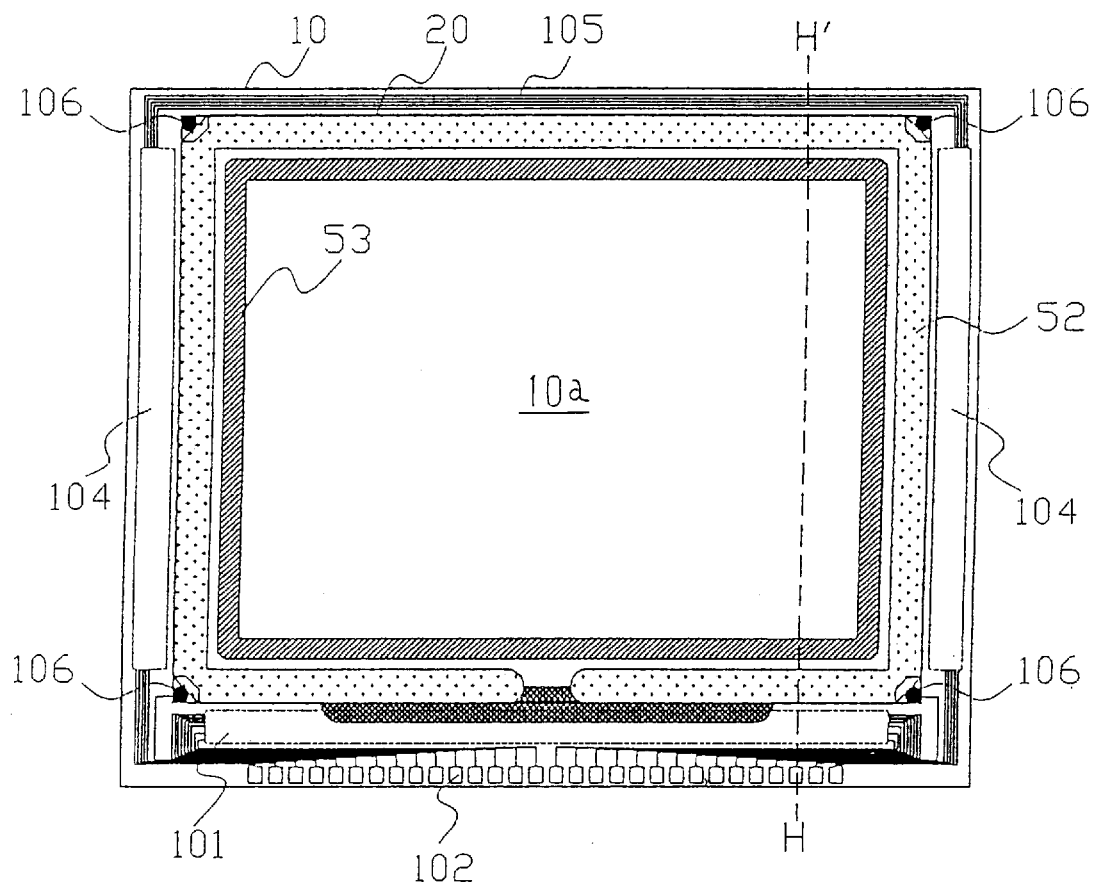
FIG. 18 is a plan view of the TFT array substrate and the components formed thereon in the electro-optical device of each embodiment, viewed from a counter substrate.
Figure 19:
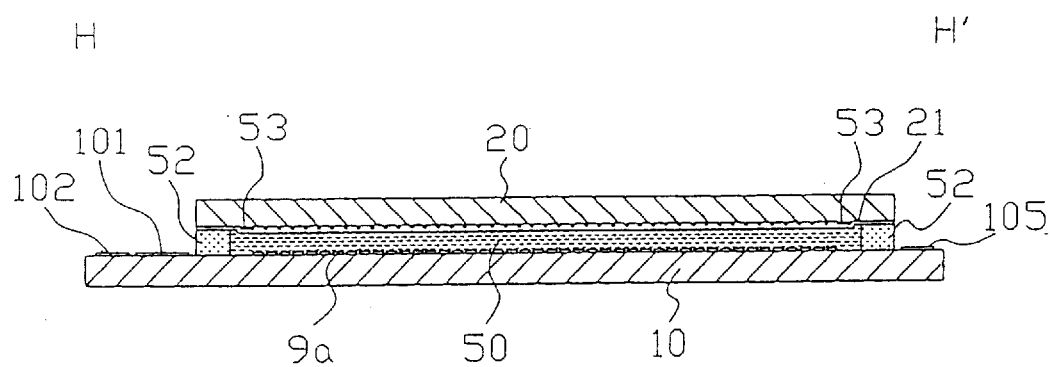
FIG. 19 is a cross-sectional view taken along line H—H' in FIG. 17.

The general construction of the electro-optical device in each of the above embodiments will now be discussed, referring to FIG. 18 and FIG. 19. FIG. 18 is a plan view showing of the TFT array substrate 10 in the electro-optical device of each embodiment with the elements formed thereon, viewed from a counter substrate 20. FIG. 19 is a cross-sectional view of the TFT array substrate taken along line H—H' shown in FIG. 18.

Referring to FIG. 18, the TFT array substrate 10 is provided with a sealing material 52 along the edge thereof, and a shield layer 53 as a display peripheral outline, which defines a display screen area 10a, extends along the internal edge of the sealing material 52. A data line driving circuit 101 for driving the data line 6a by feeding an image signal to the data line 6a at a predetermined timing, and external-circuit interconnect terminals 102 are arranged on one side of the TFT array substrate 10, external to the area of the sealing material 52, and scanning line driving circuits 104 for driving the scanning line 3a by feeding a scanning signal to the scanning line 3a are arranged on two sides of the first side of the TFT array substrate 10. If a delay in the scanning signal supplied to the scanning line 3a presents no problem, the scanning line driving circuit 104 may be mounted on one side only. Data line driving circuits 101 may be arranged on both sides of the display screen area 10a. Arranged on the remaining one side of the display screen area of the TFT array substrate 10 is a plurality of lines 105 for connecting the scanning line driving circuits 104 mounted on both sides of the image display area. A conductive material 106 for electrically connecting the TFT array substrate 10 to the counter substrate 20 is mounted at least one corner of the counter substrate 20. Referring to FIG. 19, the counter substrate 20 having almost the same outline as that of the sealing material 52 shown in FIG. 18 is bonded to the TFT array substrate 10 through the sealing material 52.

Besides the data line driving circuits 101 and the scanning line driving circuit 104, the TFT array substrate 10 may be provided with a sampling circuit for applying the image signal to the plurality of the data lines 6a at a predetermined timing, a precharge circuit for supplying a precharge signal at a predetermined voltage level to the plurality of the data lines 6a prior to the application of the image signal, and a test circuit for checking the quality and defects of the electro-optic device in the middle of the production or at the shipment thereof.

In each of the embodiment described with reference to FIG. 1 through FIG. 19, the data line driving circuit 101 and the scanning line driving circuit 104 may be electrically and mechanically connected to a driver LSI mounted on a TAB (Tape Automated Bonding board), through an anisotropic conductive film arranged around the TFT array substrate 10, rather than mounting the data line driving circuit 101 and the scanning line driving circuit 104 on the TFT array substrate 10. Arranged on the light incident side of the counter substrate 20 and the light exit side of the TFT array substrate 10 are respectively polarizer films, retardation films, and polarizers in predetermined directions to work with operation modes such as a TN (twisted nematic) mode, a VA (Vertically Aligned) mode, or a PDLC (Polymer Dispersed Liquid Crystal) mode, and normally white mode/normally black mode.

Figure 20:
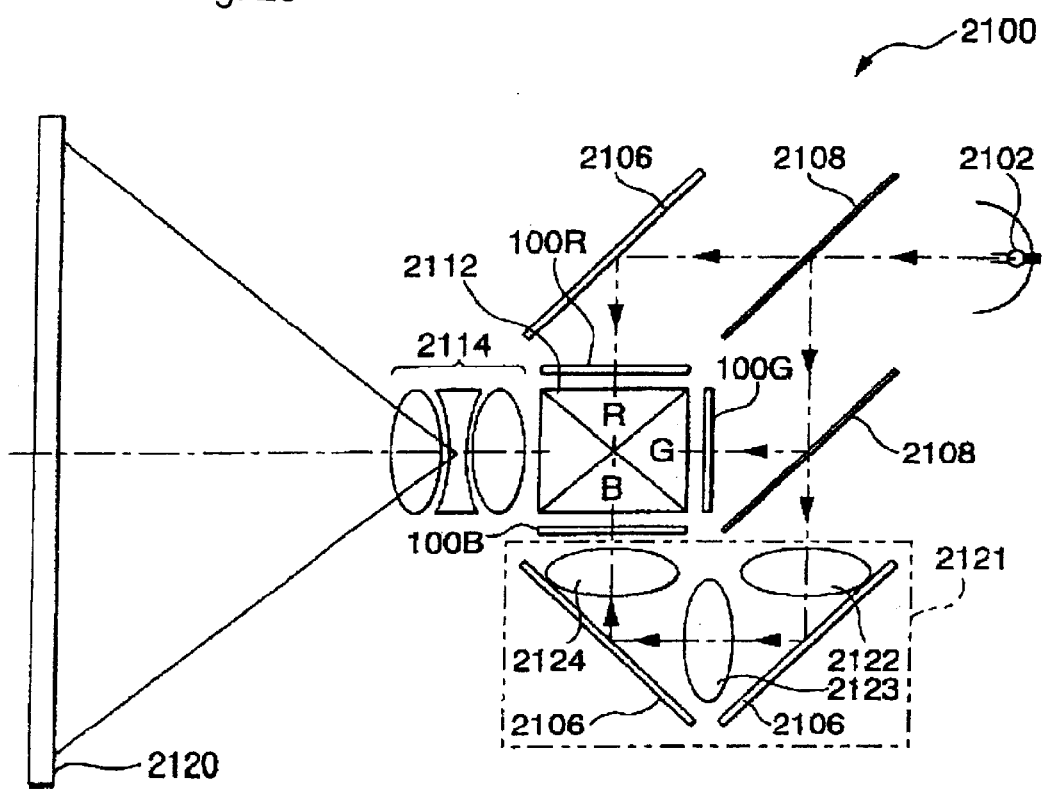
FIG. 20 is a block diagram showing a projector.

Each of the electro-optical devices of the above-referenced embodiments may be applied in a projector. A projector which uses the above-referenced electro-optical device as a light valve will now be discussed. FIG. 20 is a plan view showing the projector. As shown, the projector 2100 includes a lamp unit 2102 composed of a white light source such as a halogen lamp. A light beam from the lamp unit 2102 is separated into three primary color beams, red, green, and blue through three mirrors 2106 and two dichroic mirrors 2108, and the three color light beams are then guided to respective light valves 100R, 100G, and 100B. The light valves 100R, 100G, and 100B have the same construction as that of the electro-optical device, and are driven by the three red, green, and blue color signals supplied from an image signal processor circuit (not shown). The blue color beam travels along a path longer than those for the red and green color beams, and in order to prevent loss, the blue color beam is guided through a relay lens system 2121, composed of an incident lens 2122, a relay lens 2123, and an exit lens 2124.

The red, green, and blue light beams respectively color-modulated by the light valves 100R, 100G, and 100B are incident on a dichroic prism 2112 in three directions. The red and blue color beams are refracted at 90° by the dichroic prism 2112, while the green color beam travels straight. The three color images are synthesized, and a synthesized color image is then projected by a projection lens 2114 onto a screen 2120.

Since red, green, and blue light beams are respectively incident on the light valves 100R, 100B, and 100G through the dichroic mirrors 2108, no color filters are required. Image beams transmitted through the light valves 100R and 100B are reflected from the dichroic mirror 2112 and then projected, while an image beam transmitted through the light valve 100G is directly projected. For this reason, the image from the light valves 100R and 100B are laterally inverted with respect to the image from the light valve 100G.

In each of the above embodiments, the counter substrate 20 is equipped with no color filter. Optionally, an RGB color filter may be arranged in a predetermined area facing the pixel electrode 9a, on the counter substrate 20 along with a protective film. In this way, the electro-optical device of each embodiment finds application in direct viewing or reflective type color electro-optical devices, besides the projector. Microlenses may be arranged on the counter substrate 20 on a one microlens to one pixel basis. A color filter layer may be deposited beneath the pixel electrode 9a facing the RGB pixels on the TFT array substrate 10 using a color resist. In this way, condensation efficiency of the incident light is increased, and an electro-optical device providing a bright image can be achieved. By laminating a number of interference layers having different refractive indexes on the counter substrate 20, a dichroic filter for creating the RGB colors is formed taking advantage of interference of light. The counter substrate with such a dichroic filter equipped makes an even brighter color electro-optical device.

The present invention is not limited to the above-described embodiments, and changes are possible without departing from the scope and spirit of the present invention defined by the claims and the specification, and the electro-optical device incorporating such changes and the manufacturing method for manufacturing the electro-optical device fall within the scope of the present invention.

While this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention.

What is claimed is:

1. An electro-optical device, comprising:
   a pair of substrates;
   an electro-optical material interposed between said pair of substrates;
   a plurality of pixel electrodes arranged in a matrix on one of said substrates;
   a plurality of thin-film transistors respectively electrically connected to said pixel electrodes;
   an upper light shield layer having a crossing portion above said thin-film transistors above said one substrate;
   a lower light shield layer having a crossing portion beneath said thin-film transistor on said one substrate, and formed within a formation area of said upper light shield layer; and
   a junction of a channel region of said thin-film transistors formed within an area in which the crossing portion of said upper light shield layer and the crossing portion of said lower light shield layer overlap, wherein said upper light shield layer includes at least one electrode of a storage capacitor.

2. An electro-optical device according to claim 1, wherein said upper light shield layer is formed in a grid-like configuration to define a non-aperture area of each pixel, and said lower light shield layer is formed in a grid-like configuration.

3. An electro-optical device according to claim 2, wherein said upper light shield layer further comprises a data line electrically connected to said thin-film transistor.

4. An electro-optical device according to claim 3, wherein a semiconductor layer of said thin-film transistor is formed within an area where the region of said data line and the region of said lower light shield layer overlap each other.

5. An electro-optical device according to claim 2, wherein said upper light shield layer further comprises a plurality of first light shield layers extending in a first direction, an insulator layer formed on said first light shield layers, and a plurality of second light shield layers formed on said insulator layer and intersecting said first light shield layer extending in said first direction.

6. An electro-optical device according to claim 5, wherein said first light shield layer is at least one electrode of a storage capacitor, one electrode of the storage capacitor being electrically connected to said pixel electrode, and said second light shield layer is a data line electrically connected to said thin-film transistor.

7. An electro-optical device according to claim 2, wherein a scanning line that is electrically connected to said thin-film transistor is formed within the region of said lower light shield layer.

8. An electro-optical device according to claim 7, said scanning line being formed within the region of said upper light shield layer.

9. An electro-optical device according to claim 1, at least one of said upper light shield layer and said lower light shield layer being formed of a single light shield layer.

10. An electro-optical device according to claim 9, wherein the same single light shield layer comprises a plurality of light shield crossing portions, each arranged over said thin-film transistor.

11. An electro-optical device according to claim 1, wherein a semiconductor layer of said thin-film transistor comprises a channel, a region which is heavily doped with an impurity, and a region which is lightly doped with an impurity that is arranged between said channel and said heavily doped region, and wherein said lightly doped region is formed within an area where the crossing portion of said upper light shield layer and the crossing portion of said lower light shield layer overlap each other.

12. An electro-optical device according to claim 1, wherein an edge of said lower light shield layer in a cross section perpendicular to said one substrate recedes from an edge of said upper light shield layer corresponding to the edge of said lower light shield layer by 10 degrees or more.

13. An electro-optical device according to claim 1, wherein a counter light shield layer is arranged on the substrate that is opposed to said one substrate within the formation area of said upper light shield layer.

14. A projection-type display apparatus, comprising:
    a light source;
    a light valve comprising an electro-optical device according to claim 1;
    a light guide member that guides light, generated by said light source, to said light valve; and
    a projection optical member that projects light modulated by said light valve.

15. An electro-optical device, comprising:
    a pair of substrates;
    an electro-optical material interposed between said pair of substrates;
    a plurality of pixel electrodes arranged in a matrix on one of said substrates;
    a plurality of thin-film transistors respectively electrically connected to said pixel electrodes;
    a light shield layer which is arranged over said plurality of thin-film transistors above the one substrate and is a laminate of a light absorption sublayer and a light shield sublayer, wherein said light absorption sublayer is formed on a side of said light shield layer facing said thin-film transistors, and said light shield sublayer is formed on a side of said light shield layer opposite to said plurality of thin-film transistors;
    a data line electrically connected to said thin-film transistors and intersecting said light shield layer; and
    a junction of a channel region of said thin-film transistor which is formed within an area in which said light shield layer overlaps said data line.

16. An electro-optical device according to claim 15, said light shield layer being arranged between said data line and said thin-film transistor.

17. An electro-optical device according to claim 15, said data line being arranged between said light shield layer and said thin-film transistor.

18. An electro-optical device according to claim 17, said data line being a light absorption layer laminated on a side thereof facing said thin-film transistor.

19. An electro-optical device according to claim 15, said light shield layer forming a storage capacitor, one electrode of the storage capacitor being electrically connected to said pixel electrode.

20. An electro-optical device according to claim 19, said storage capacitor including a capacitor electrode formed of said light absorption layer facing said thin-film transistor, a capacitor electrode formed of said light shield layer and opposed to said capacitor electrode of said light absorption layer, and a dielectric layer interposed between said two capacitor electrodes.

21. An electro-optical device according to claim 20, wherein the capacitor electrode of said light shield layer has a light absorption layer laminated on the surface of said capacitor electrode facing said thin-film transistor.

22. An electro-optical device according to claim 15, said light shield layer being connected to a constant-potential line in a peripheral area surrounding a pixel display area in which the pixel electrode is arranged.

23. An electro-optical device according to claim 15, further comprising a lower light shield layer arranged in a grid-like configuration beneath said plurality of thin-film transistors on the one substrate, wherein said lower light shield layer is formed within a formation area of said upper light shield layer, and covers a junction of a channel region of said thin-film transistor.

24. A projection-type display apparatus, comprising:
   a light source;
   a light valve comprising an electro-optical device according to claim 15;
   a light guide member that guides light generated by said light source to said light valve; and
   a projection optical member that projects light modulated by said light valve.

25. An electro-optical device, comprising:
   a pair of substrates;
   an electro-optical material interposed between said pair of substrates;
   a plurality of pixel electrodes arranged in a matrix on one of said substrates;
   a plurality of thin-film transistors respectively electrically connected to said pixel electrodes;
   an upper light shield layer having a crossing portion above said thin-film transistor above said one substrate;
   a lower light shield layer having a crossing portion beneath said thin-film transistor on said one substrate, and formed within a formation area of said upper light shield layer; and
   a junction of a channel region of said thin-film transistors formed within an area in which the crossing portion of said upper light shield layer and the crossing portion of said lower light shield layer overlap, wherein said upper light shield layer includes a storage capacitor line.

\* \* \* \* \*